US012800744B2

(12) United States Patent
Wang et al.

(10) Patent No.: US 12,800,744 B2
(45) Date of Patent: Nov. 17, 2026

(54) SYSTEM AND METHOD FOR RADAR OBJECT DETECTION AND TRACKING USING CROSS-FRAME SPATIAL-TEMPORAL RELATIONALITY

(71) Applicant: Mitsubishi Electric Research Laboratories, Inc., Cambridge, MA (US)

(72) Inventors: Pu Wang, Cambridge, MA (US); Ryoma Yataka, Cambridge, MA (US); Petros Boufounos, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 299 days.

(21) Appl. No.: 18/586,720

(22) Filed: Feb. 26, 2024

(65) Prior Publication Data

US 2025/0271569 A1 Aug. 28, 2025

(51) Int. Cl.

| | |
|---|---|
| ***G01S 13/72*** | (2006.01) |
| ***G01S 7/41*** | (2006.01) |
| ***G01S 13/89*** | (2006.01) |
| ***G01S 13/931*** | (2020.01) |

(52) U.S. Cl.
CPC ............ *G01S 13/726* (2013.01); *G01S 7/417* (2013.01); *G01S 13/89* (2013.01); *G01S 13/931* (2013.01)

(58) Field of Classification Search
CPC ........ G01S 13/726; G01S 7/417; G01S 13/89; G01S 13/931
See application file for complete search history.

(56) References Cited

U.S. PATENT DOCUMENTS

| | | | | |
|---|---|---|---|---|
| 12,271,790 B1 * | 4/2025 | King | ........................ | G01S 17/66 |
| 12,315,083 B2 * | 5/2025 | Sun | ........................ | G06F 30/27 |
| 2022/0120858 A1 * | 4/2022 | Cennamo | ................ | G01S 7/417 |

(Continued)

OTHER PUBLICATIONS

Liu, Ze, et al. "Swin transformer: Hierarchical vision transformer using shifted windows." Proceedings of the IEEE/CVF international conference on computer vision. 2021. (Year: 2021).*

(Continued)

*Primary Examiner* — Nazra Nur Waheed
(74) *Attorney, Agent, or Firm* — Gene Vinokur

(57) ABSTRACT

The present disclosure provides a system and a method for detecting and tracking one or more objects in a scene. The method includes collecting features of each radar image in a sequence of radar images to form a spatiotemporal pool of features. The method further includes processing, using a neural network employing an attention mechanism, the spatiotemporal pool of features to generate a spatiotemporal pool of selected features. The method further includes processing, using the neural network employing a window shifting mechanism, the spatiotemporal pool of selected features to generate discrete spatiotemporal patches. The method further includes processing, using the neural network employing the attention mechanism, the discrete spatiotemporal patches to generate an enhanced spatiotemporal pool of features. The method further includes determining at least one property of the one or more objects in the scene based on the enhanced spatiotemporal pool of features.

21 Claims, 24 Drawing Sheets

(56) References Cited

U.S. PATENT DOCUMENTS

| | | | | |
|---|---|---|---|---|
| 2023/0305136 | A1 | 9/2023 | Wang | |
| 2024/0005547 | A1* | 1/2024 | Lin | G06T 7/70 |
| 2024/0062520 | A1* | 2/2024 | Park | B60R 1/28 |
| 2024/0127596 | A1* | 4/2024 | Singh | G01S 13/931 |
| 2025/0225721 | A1* | 7/2025 | Irshad | G06N 3/08 |

OTHER PUBLICATIONS

Peizhao Li, Pu Wang, Karl Berntorp, and Hongfu Liu, "Exploiting temporal relations on radar perception for autonomous driving," in 2022 IEEE/CVF Conference on Computer Vision and Pattern Recognition (CVPR), 2022, pp. 17050-17059.

Bin Yang, Runsheng Guo, Ming Liang, Sergio Casas, and Raquel Urtasun, "Radarnet: Exploiting radar for robust perception of dynamic objects," in Computer Vision—ECCV 2020, 2020, pp. 496-512.

* cited by examiner

1400

1401 Input: A Video Sequence V; Object Detector ETR; Direction Estimator DEst; Detection Score Threshold $\gamma$; Birth Threshold 1403 1. Initialization $\mathcal{T} \leftarrow \phi$ 2. For frame 1405 3. $D_K \leftarrow \mathrm{ETR}(f_k)$ 1407 4. $\mathcal{J}_K \leftarrow \mathrm{DEst}(f_K)$ 1409 5. $D_{high} \leftarrow \phi$ 1411 6. $\mathcal{J}_{high} \leftarrow \phi$ 1413 7. for d, j in Dk, Jk do 8. if d.score > $\gamma$ then 9. $D_{high} \leftarrow D_{high} \cup \{d\}$ 10. $\mathcal{J}_{high} \leftarrow \mathcal{J}_{high} \cup \{j\}$ 11. end 12. end 1415 13. for t in $\mathcal{T}$ do 14. t ← KalmanFilter.predict(t)

15. end 1417 16. Associate $\mathcal{T}$ and $D_{high}$ & $\mathcal{J}_{high}$ with Similarity equation 1419 17. $D_{remain} \leftarrow$ remaining unmatched object from $D_{high}$ 1421 18. $\mathcal{T}_{remain} \leftarrow$ remaining matched tracks from $\mathcal{T}$ 1423 19. for t in $\mathcal{T}_{remain}$ do 20. t ← KalmanFilter.update(t)

21. end 1423 22. $\mathcal{T} \leftarrow \mathcal{T} \setminus \mathcal{T}_{remain}$ 1425 23. for d in $D_{remain}$ do 24. if d.score > $\beta$ then 25. $\mathcal{T} \leftarrow \mathcal{T} \cup \{d\}$ 26. end 27. end 28. end 29. Return: $\mathcal{T}$

FIG. 14

SYSTEM AND METHOD FOR RADAR OBJECT DETECTION AND TRACKING USING CROSS-FRAME SPATIAL-TEMPORAL RELATIONALITY

TECHNICAL FIELD

The present disclosure relates generally to radar systems, and more specifically to a system and a method for detection and tracking of one or more objects using radar systems.

BACKGROUND

Automotive perception plays a crucial rule in enabling various advanced driver assistance systems and autonomous driving technologies. The automotive perception utilizes various arrays of perception sensors to interpret an external driving environment and internal vehicle cabin conditions. The automotive perception enables the advanced driver assistance systems and the autonomous driving technologies for dynamic object detection, adaptive cruise control, automatic emergency braking. Among the various arrays of perception sensors employed in the automotive perception, camera sensors and Lidar sensors are the two dominant sensors used for surrounding object recognition. The camera sensors provide semantically rich visual features of the external driving environment. Further, the Lidar sensors provide high-resolution point clouds that can capture reflection of objects in the external driving environment.

However, there are various problems associated with utilization of the camera sensors and the light sensors for automotive perception. The camera sensors and the Lidar sensors are dependent on light conditions, for example, night, sun glare, and the like. Additionally, an object detection accuracy of the camera sensors and the Lidar sensors can reduce in low-light conditions. Further, the camera sensors and the Lidar sensors may be obstructed in adverse weather conditions, for example, rain, snow, fog or dust, and the like, reducing the object detection accuracy.

Compared to the camera sensors and the Lidar sensors, utilization of radar for automotive perception is cost-effective, readily configurable, and provides long-range perception in various light conditions and adverse weather conditions. The radar transmits electromagnetic waves at a millimeter-wavelength to estimate one or more properties of the objects, for example, a range, a velocity, and an angle of objects. At such a wavelength, it can penetrate or diffract around tiny particles in rain, fog, snow, and dust and offers long-range perception in the adverse weather conditions. In contrast, laser sent by the Lidar at a much smaller wavelength may bounce off the tiny particles, which leads to a significantly reduced operating range. Compared with the camera sensors, the radar is also resilient to light conditions, e.g., night, sun glare, etc. Besides, the radar offers a cost-effective and reliable option to complement other sensors.

Despite the aforementioned advantages provided by the radar in the automotive perception, there are various limitations associated with the radar-assisted automotive perception. For example, the radar may provide low angular resolution in azimuth domains and elevation domains. Further, inherent noise including multiple reflections and ghost reflections decreases an object tracking accuracy. Therefore, there is a need for a system and a method to overcome the various limitations associated with the radar-assisted automotive perception.

SUMMARY

It is an object of some embodiments to overcome limitations associated with radar based automotive perception by utilizing spatial-temporal information from a sequence of radar images. The limitations include but are not limited to a low angular resolution and a limited capacity for radar object tracking in a scene. The scene may include one or more objects, for example, vehicles, pedestrian, and the like. The sequence of radar images is indicative of radar measurements of the scene at different consecutive instances of time. It is also an object of some embodiments to leverage consistency of an object's existence and features to model relations between the one or more objects within the sequence of radar images.

Some embodiments are based on an understanding that a spatiotemporal pool of features can be generated based on collected features of each radar image in the sequence of radar images to utilize spatiotemporal relations within the sequence of radar images for the radar object while such an approach may be practical for other modalities like camera images and speech signal, this approach does not provide a satisfactory result for radar object tracking.

Some embodiments are based on recognizing that nature and the number of features in each radar image is one of the reasons for degrading a quality of spatiotemporal relations among the radar images of the sequence of radar image frames. For example, in contrast with camera images, the features of the radar images are semantically poor that makes establishing the spatiotemporal correlation harder. Further, versatility and rapid changes associated with the scene can alter related features in the radar images. Such alteration may be corrected based on semantics of the related features, but as mentioned above, the features of the radar image frames are semantically poor. In combination, such a nature of the radar images degrades the ability to train a neural network suitable for object tracking in autonomous driving based on the sequence of radar images.

Some embodiments are based on an understanding that aforementioned problems can be addressed by applying an attention mechanism across features of radar images of the sequence of radar images to obtain spatiotemporal relation across the radar images. However, applying attention mechanism to a long time horizon may lead to an increase in computational complexity over a number of features from each frame and a number of radar images. The increased computational complexity may lead to computationally prohibitive operations for various embedded systems used for controlling the one or more during autonomous driving. In an example embodiment, the increased computational complexity corresponds to a computational complexity in order of $O(T^2K^2)$, where T is the number of images, and K is the number of features in the spatiotemporal pool of features.

Some embodiments are based on an understanding that the attention mechanism can be applied on the spatiotemporal pool of features to generate a spatiotemporal pool of selected features. Further, some embodiments are based on a realization that the spatiotemporal pool of selected features can be partitioned to generate discrete spatiotemporal patches. Further, some embodiments are based on an objective to apply the attention mechanism iteratively on each discrete spatiotemporal patch of the discrete spatiotemporal patches to enhance feature associated with each discrete spatiotemporal pool of features. Further, some embodiments are based on an objective to merge enhanced features associated with each discrete spatiotemporal feature of the discrete spatiotemporal features to generate an enhanced spatiotemporal pool of features. The iterative implementation of the attention mechanism to each discrete spatiotemporal patch of the discrete spatiotemporal patches allows for reduction of the complexity of the attention mechanism and enables connective attention across each radar image of the sequence of radar images.

In an example embodiment, the spatiotemporal pool of updated features can be partitioned to at least two discrete spatiotemporal patches. Further, the attention mechanism can be applied on a first discrete spatiotemporal patch of the discrete spatiotemporal patches in a first iteration. Further, the attention mechanism can be applied on a second discrete spatiotemporal patch of the discrete spatiotemporal patches in a second iteration. The iterative implementation of the attention mechanism allows for the connective attention corresponding to the discrete spatiotemporal patches, for example, the first discrete spatiotemporal patch and the second spatiotemporal patch and a decrease in the computational complexity associated with the attention mechanism. In an example embodiment, the computational complexity in order of $O(T^2K^2)$ is reduced to a computational complexity in order of $O(K^2)$.

Further, some embodiments are based on an objective to determine at least one property of the one or more objects in the scene based on the enhanced spatiotemporal pool of features.

Some embodiments are based on an understanding that a non-linear motion of the one or more objects in the scene may lead to a high severity of the various limitations associated with the radar based automotive perception. Additionally, a complex combination of factors, including effects of high speed linear motions dynamics and poor semantic nature of radar images may lead to an increase in tracking errors.

Some embodiments are based on an objective to overcome the problems associated with the non-linear motion of the one or more objects in the scene by predicting an arbitral non-linear motion of the one or more objects in the sequence of radar images and an association between the one or more objects in the sequence of radar images to enhance a spatial consistency during automotive perception.

Accordingly, one embodiment discloses a radar system for tracking one or more objects in a scene. The radar system comprises a processor; and a memory having instructions stored thereon that, when executed by the processor, cause the radar system to: collect features in a sequence of radar images indicative of radar measurements of the scene at different consecutive instances of time to form a spatiotemporal pool of features collected across space and time, wherein the sequence of radar images includes a plurality of radar images; process, using a neural network employing an attention mechanism, the spatiotemporal pool of features to generate a spatiotemporal pool of selected features; process, using the neural network employing a window shifting mechanism, the spatiotemporal pool of selected features to generate discrete spatiotemporal patches; process, using the neural network employing the attention mechanism, the discrete spatiotemporal patches to generate an enhanced spatiotemporal pool of features; and determine at least one property of the one or more objects in the scene based on the enhanced spatiotemporal of features.

Accordingly, another embodiment discloses a method for tracking one or more objects. The method comprises collecting features in a sequence of radar images indicative of radar measurements of the scene at different consecutive instances of time to form a spatiotemporal pool of features collected across space and time, wherein the sequence of radar images includes a plurality of radar images; processing, using a neural network employing an attention mechanism, the spatiotemporal pool of features to generate a spatiotemporal pool of selected features; processing, using the neural network employing a window shifting mechanism, the spatiotemporal pool of selected features to generate discrete spatiotemporal patches; processing, using the neural network employing the attention mechanism, the discrete spatiotemporal patches to generate an enhanced spatiotemporal pool of features; and determining at least one property of the one or more objects in the scene based on the enhanced spatiotemporal pool of features.

Accordingly, yet another embodiment discloses a non-transitory computer-readable storage medium embodied thereon a program executable by a processor for performing a method for tracking one or more objects in a scene. The method comprises collecting features in a sequence of radar images indicative of radar measurements of the scene at different consecutive instances of time to form a spatiotemporal pool of features collected across space and time, wherein the sequence of radar images includes a plurality of radar images; processing, using a neural network employing an attention mechanism, the spatiotemporal pool of features to generate a spatiotemporal pool of selected features; processing, using the neural network employing a window shifting mechanism, the spatiotemporal pool of selected features to generate discrete spatiotemporal patches; processing, using the neural network employing the attention mechanism, the discrete spatiotemporal patches to generate an enhanced spatiotemporal pool of features; and determining at least one property of the one or more objects in the scene based on the enhanced spatiotemporal pool of features.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 14 illustrates an object tracking algorithm, according to an embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
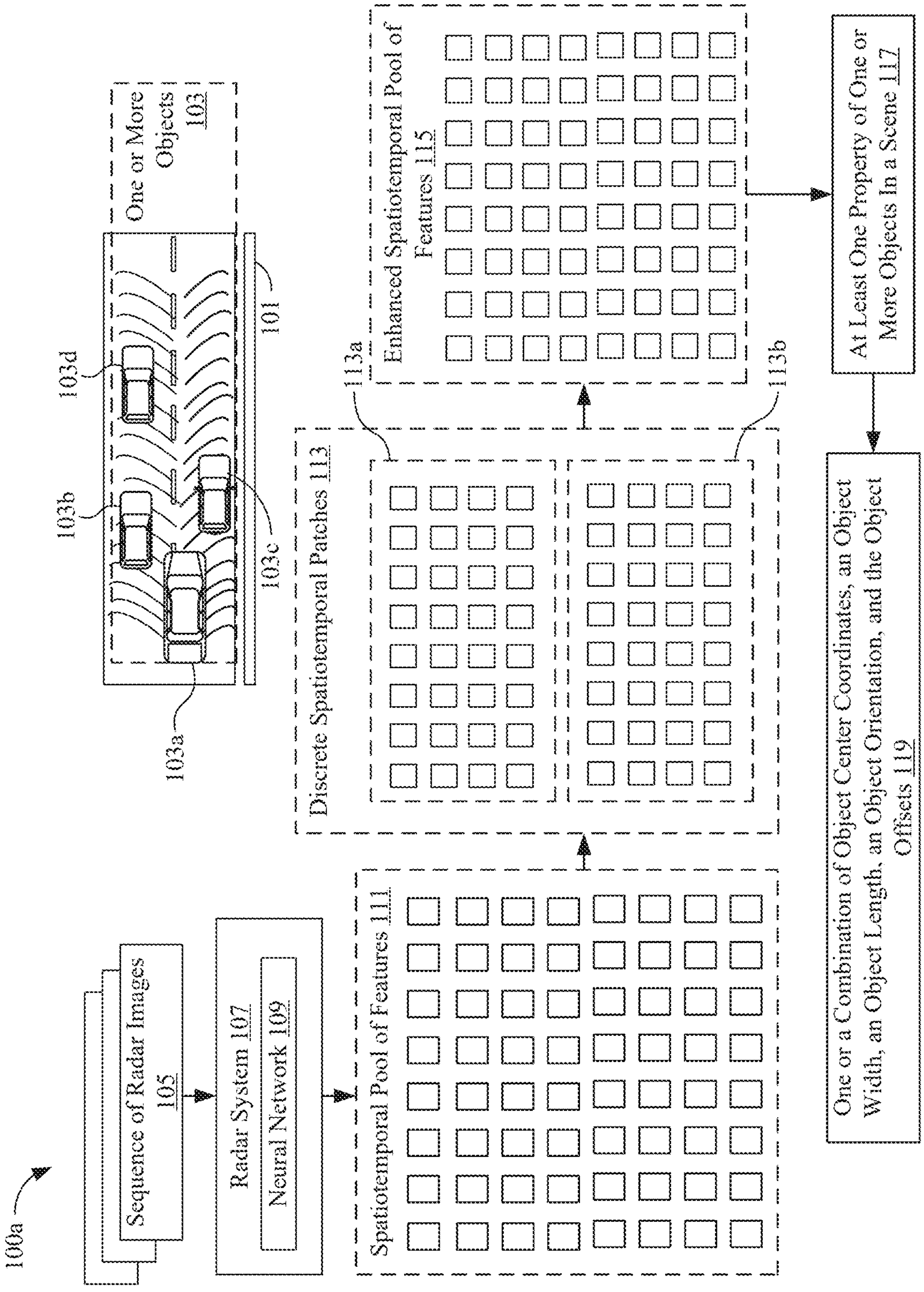
FIG. 1A illustrates a schematic for radar object detection and tracking of one or more objects, according to an embodiment of the present disclosure.

FIG. 1A illustrates a schematic 100*a* for radar object detection and tracking of one or more objects 103, according to an embodiment of the present disclosure. The schematic 100 includes the one or more objects 103 in a scene 101. Further, the one or more objects 103 include a vehicle 103*a*, a vehicle 103*b*, a vehicle 103*c*, and a vehicle 103*d*. For the purpose of explanation, the scene 101 including four vehicles is considered. However, the scene 101 may include at least one object. The one or more objects 103 may include any objects. The any objects include, but are not limited to vehicles, drones, and inventory items.

In some embodiments, the scene 101 may be referred to as "driving environment". Examples of the driving environment include, but are not limited to, transportation lanes, streets, highways, parking lots, tunnels, circular intersections, residential areas, traffic interchanges, bridges, and emergency routes.

It is an object of some embodiments to utilize a radar system 107 for automotive perception. For ease of explanation, the radar system 107 is shown separately from the one or more objects 103. However, the radar system 107 may be integrated with the one or more objects 103, for example, the vehicle 103*a*. Some embodiments are based on an objective to collect a sequence of radar images 105 indicative of radar measurements of the scene 101 at different consecutive instances of time. The sequence of radar images 105 includes a plurality of radar images.

Further, the radar system 107 includes a neural network 109 to determine at least one property 117 of the one or more objects 103 in the scene 101 based on the sequence of radar images 105. The at least one property 117 of the one or more objects 103 in the scene 101 includes one or a combination of an object center coordinates, an object width, an object length, an object height, an object orientation, and an object offsets 119.

Some embodiments are based on an objective to transmit electromagnetic waves to generate the sequence of radar images 105. In some embodiments, the electromagnetic waves are transmitted at a plurality of wavelengths. The plurality of wavelengths includes, but is not limited to, a millimeter wavelength, a terahertz wavelength, and the like. In some embodiments, the electromagnetic waves may be referred to as "radio waves". The electromagnetic waves allows penetration or diffraction around tiny particles in adverse weather conditions, for example, rain, fog, snow, and dust and provides long-range perception. However, while radars are cost effective and robust in all-weather conditions for automotive perception, the radar measurements suffer from a low angular resolution in azimuth domains and elevation domains. Further, the radar measurements include inherent noise that decreases an object detection accuracy and an object tracking accuracy. The inherent noise includes, but is not limited to, multiple reflections and ghost reflections.

Some embodiments are based on an objective to overcome aforementioned problems associated with radar based automotive perception by utilizing spatiotemporal relations across the sequence of radar images 105 to enhance quality and/or resolution of the radar object detection and tracking. Hence, it is an object of some embodiments to leverage consistency of an object's existence and features to model the spatiotemporal relations between the one or more objects 103 within the sequence of radar images 105.

Some embodiments are based on an objective to collect features of each radar image in the sequence of radar images 105 to generate a spatiotemporal pool of features 111 collected across space and time. Further, each feature of the spatiotemporal pool of features 111 may be placed in context of each other to take advantage of the spatiotemporal relations among the sequence of radar image frames 105. However, while such an approach may be practical for other modalities like camera images and speech signals, this approach does not provide a satisfactory result for the radar object detection and tracking.

Some embodiments are based on a recognition that a nature and a number of features in each radar image is one of the reasons for degrading a quality of spatiotemporal relations among the radar images of the sequence of radar images 105. For example, in contrast with camera images, the features of the radar images are semantically poor that makes obtaining the spatiotemporal relation harder. Further, versatility and rapid changes associated with the scene 101 may alter the features associated with the radar images of the sequence of radar images 105.

Some embodiments are based on an understanding that such alteration may be corrected based on semantics of the features of radar images. However, as mentioned above, the features of the radar images are semantically poor, leading to a degradation of an ability to train the neural network 109 for radar object detection and tracking of the one or more objects 103 in the scene 101.

Some embodiments are based on an understanding that the problems associated with a poor semantic quality of the features of radar images can be addressed by enhancing features of the spatiotemporal pool of features 111. Some embodiments are based on an objective to enhance the features of the spatiotemporal pool of features 111 by using the neural network 109. In some embodiments, the spatiotemporal pool of features 111 corresponds to a subset of the collected features of each radar image in the sequence of radar images 105.

However, processing of the spatiotemporal pool of features 111 using the neural network 109 over a long time horizon may lead to an increase in computational complexity. The increased computational complexity may lead to computationally prohibitive operations for various embedded systems used for controlling the one or more objects 103, for example, the vehicle 103*a* during autonomous driving.

Some embodiments are based on a realization that the computational complexity may be decreased by partitioning the spatiotemporal pool of features 111 to generate discrete spatiotemporal patches 113 and processing, using the neural network 109, the discrete spatiotemporal patches 113 to generate the enhanced spatiotemporal pool of features 115.

The discrete spatiotemporal patches 113 include at least two discrete spatiotemporal patches, for example, a first discrete spatiotemporal patch, for example, a discrete spatiotemporal patch 113*a*, and a second discrete spatiotemporal patch, for example, a discrete spatiotemporal patch 113*b*. Additionally or alternatively, the discrete spatiotemporal patch 113*a* and the discrete spatiotemporal patch 113*b* include overlapping features. Some embodiments are based on an objective to determine the at least one property 117 of the one or more objects 103 in the scene 101 based on the enhanced spatiotemporal pool of features 115.

Some embodiments are based on an objective to process, using the neural network 109 employing an attention mechanism, the discrete spatiotemporal patches 113 to generate the enhanced spatiotemporal pool of features 115. According, an enhancement of the features of the spatiotemporal pool of features 111 using the attention mechanism is explained with reference to FIG. 1B.

Figure 1B:
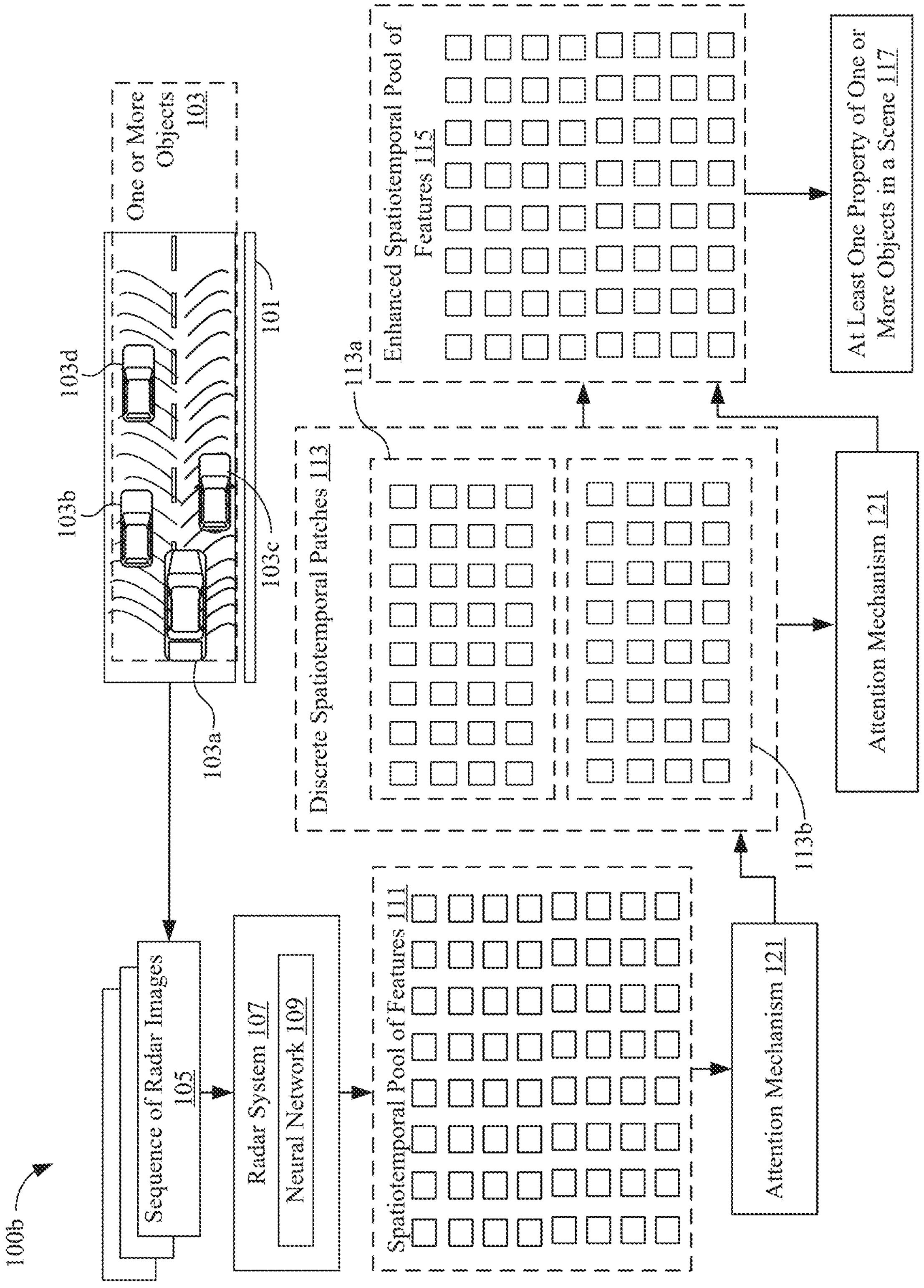
FIG. 1B illustrates a schematic for radar object detection and tracking of the one or more objects using the neural network employing an attention mechanism, according to an embodiment of the present disclosure.

FIG. 1B illustrates a schematic 100*b* for radar object detection and tracking of the one or more objects 103 using the neural network 109 employing an attention mechanism 121, according to an embodiment of the present disclosure. Some embodiments are based on a recognition that the attention mechanism 121 employed by the neural network 109 may place each feature of the spatiotemporal pool of features 111 in the context of each other to take advantage of the spatiotemporal relations among the sequence of radar images 105. The attention mechanism 121 allows an enhancement of the spatiotemporal pool of features 111 to generate the enhanced spatiotemporal pool of features 115.

Some embodiments are based on a recognition that due to the poor semantic quality of the radar images there is a need for the plurality of radar images to enhance the spatiotemporal pool of features 111 with attention mechanism 121 employed by the neural network 109. However, a direct enhancement of the spatiotemporal pool of features 111 based on the processing of the plurality of radar images with the attention mechanism 121 leads to an increase the computation complexity. In an example embodiment, the increased computational complexity corresponds to a computational complexity in order of $O(T^2K^2)$, where T is a number of images, and K is a number of features in the spatiotemporal pool of features. 111.

Some embodiments are based on a recognition that features of each two consecutive images of the sequence of radar images 105 may be processed sequentially with the attention mechanism 121 to generate the enhanced spatiotemporal pool of features 115. However, the sequential processing may lead to the inherent noise, an object occlusion, and a slow convergence to obtain the spatiotemporal relations over the long time horizon. Accordingly a schematic is provided with reference to FIG. 2A.

Some embodiments are based on an understanding that the attention mechanism 121 can be applied on the spatiotemporal pool of features 111 to select features from each two consecutive radar images in the sequence of radar images. Further, some embodiments are based on a realization that selected features can be partitioned to generate the discrete spatiotemporal patches 113. Further, the complexity of the attention mechanism 121 can be decreased by applying the attention mechanism 121 iteratively on each discrete spatiotemporal patch of the discrete spatiotemporal patches 113 to enhance features associated with each discrete spatiotemporal patch of the discrete spatiotemporal patches 113. Further, some embodiments are based on an objective to merge the enhanced features associated with each discrete spatiotemporal patch of the discrete spatiotemporal patches 113. The iterative implementation of the attention mechanism 121 to each discrete spatiotemporal patch of the discrete spatiotemporal patches, for example, the discrete spatiotemporal patch 113*a* and the discrete spatiotemporal patch 113*b* allows for reduction of the complexity of the attention mechanism and enables connective attention across each radar image of the sequence of radar images.

Further, some embodiments are based on an objective to process, each discrete spatiotemporal patch of the discrete spatiotemporal patches 113, with the attention mechanism 121, iteratively. In an example embodiment, the neural network 109 is configured to employ the attention mechanism 121 on the discrete spatiotemporal patch 113*a* in a first iteration. Further, the neural network 109 is further configured to employ the attention mechanism 121 on the discrete spatiotemporal patch 113*b* in a second iteration. The iterative implementation of the attention mechanism 121 allows for the connective attention across the discrete spatiotemporal patches 113 and a decrease in the computational complexity. In an example embodiment, the computational complexity in order of $O(T^2K^2)$ is reduced to a computational complexity in order of $O(K^2)$.

Some embodiments are based on an objective to determine bi-directional spatiotemporal relations in the sequence of radar images 105 based on the connective attention across the discrete spatiotemporal patches 113. Accordingly a schematic is provided with reference to FIG. 2A.

Figure 2A:
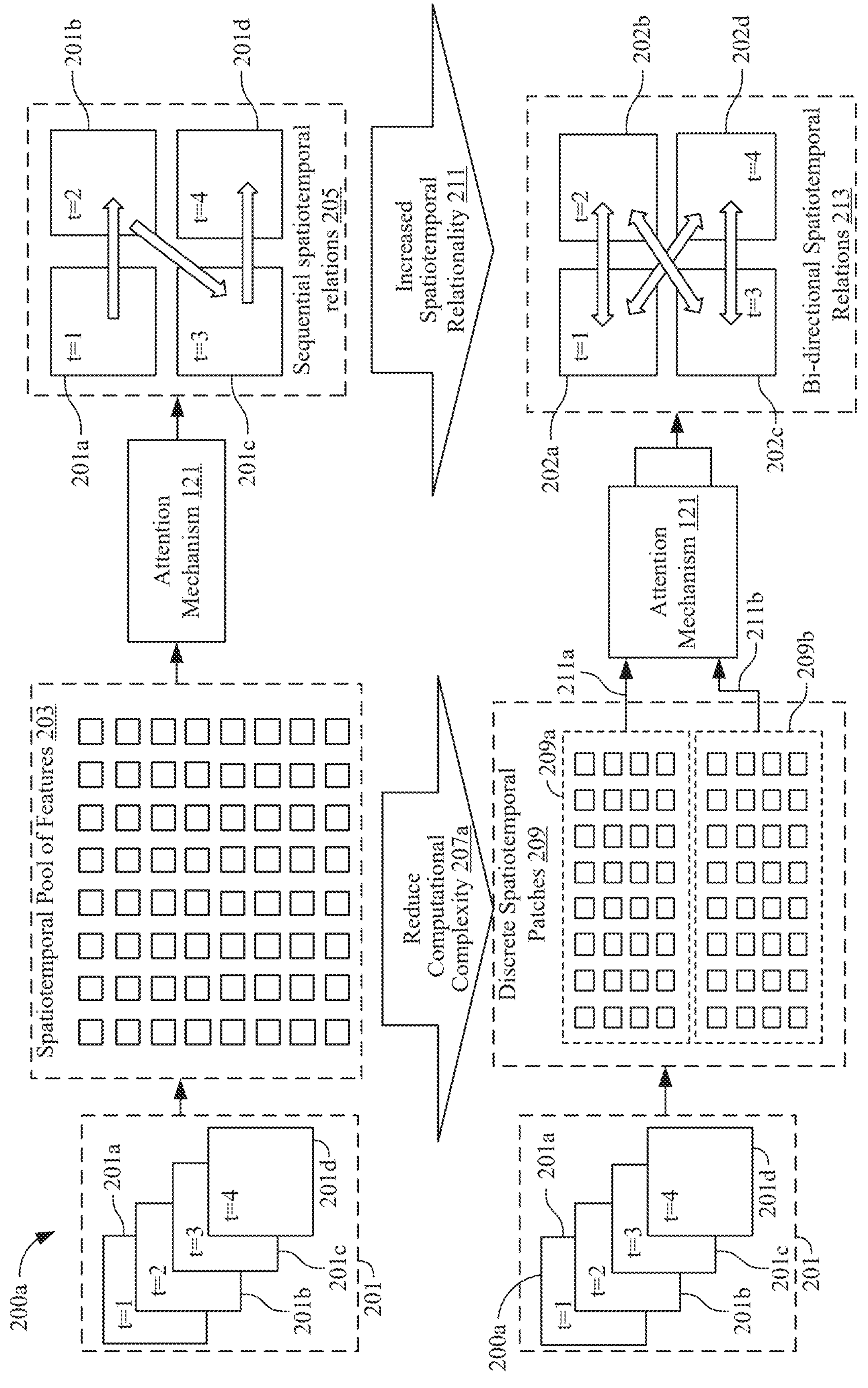
FIG. 2A illustrates a schematic of principle for determining a bi-directional spatiotemporal relation in a first exemplary sequence of radar images, according to an embodiment of the present disclosure.

FIG. 2A illustrates a schematic 200*a* of principle for determining bi-directional spatiotemporal relations 213 in a first exemplary sequence of radar images 201, according to an embodiment of the present disclosure. As shown by FIG. 2A, the first exemplary sequence of radar images 201 includes a radar image 201*a*, a radar image 201*b*, a radar image 201*c*, and a radar image 201*d*.

Some embodiments are based on an objective to collect feature of each two consecutive radar images of the sequence of radar images 201 to generate a spatiotemporal pool of features 203.

Further, some embodiments are based on an objective to apply the attention mechanism 121 on the spatiotemporal pool of features 203 to enhance each feature of the attention mechanism 121 on the spatiotemporal pool of features 203. However, as explained above, a direct enhancement of the spatiotemporal pool of features 203 leads to the increased computational complexity. Further, some embodiments are based on an objective to determine sequential spatiotemporal relations 205 based on enhanced features of each two consecutive radar images of the sequence of radar images 201. Some embodiments are based on an objective to utilize the sequential spatiotemporal relations 205 for radar object detection and tracking in the sequence of radar images 201.

However, as mentioned above, the sequential spatiotemporal relations 205 may suffer from the inherent noise, the object occlusion and the slow convergence over the long time horizon, leading to a decrease in the object detection accuracy and the object tracking accuracy. Additionally or alternatively, a sequential nature of the sequential spatiotemporal relation 205 may lead to a limited spatiotemporal relationality among the radar images of the sequence of radar images 201.

Some embodiments are based on an objective to reduce 207*a* the computational complexity by partitioning the spatiotemporal pool of features 203 to generate discrete spatiotemporal patches 209 and applying the attention mechanism 121 iteratively on each discrete spatiotemporal patch of the discrete spatiotemporal patches, for example, discrete spatiotemporal patch 209*a*, and a discrete spatiotemporal patch 209*b*. In an example embodiment, the neural network 109 is further configured to employ the attention mechanism 121 on the discrete spatiotemporal patch 209*a* in a first iteration 211*a* to enhance first features of the discrete spatiotemporal patches 209*a*. Further, the neural network 109 is further configured to employ the attention mechanism 121 on the discrete spatiotemporal patch 209*b* in a second iteration 211*b* to enhance second features of the discrete spatiotemporal patches 209*b*. Further, some embodiments are based on an objective to increase 207*b* the spatial temporal relationality by merging the first enhanced features of the discrete spatiotemporal patch 209*a* and the second enhanced features of the discrete spatiotemporal patch 209*b* and determining the bi-directional spatiotemporal relations 213 among radar images of the sequence of radar images 201.

Some embodiments are based on an understanding that a non-linear motion associated with the one or more objects 103 in the scene 101 may exacerbate the various limitations associated with radar based automotive perception. Further, the non-linear motion within the sequence of radar images 105 may lack spatial-temporal information, leading to the decrease in the object detection accuracy and the object tracking accuracy. Additionally, a complex combination of factors, including effects of high speed linear motions dynamics and the poor semantic nature of radar images may lead to an increase in tracking errors.

Some embodiments are based on an objective to utilize a temporal consistency of moving objects for accurate object detection while maintaining a computational efficiency over the long time horizon. Some embodiments are based on an objective to increase a scalability by processing the radar images in the sequence of radar images 105 with a temporally regrouped window attention. The temporally regrouped window attention enables the radar object detection and the radar object tracking over the long time horizon.

Some embodiment are based on an objective to overcome the problems associated with the non-linear motion of the one or more objects 103 in the scene 101 by predicting, using positional vectors generated based on the spatiotemporal pool of features 115, an arbitral non-linear motion of the one or more objects 103 in the sequence of radar images 105 and a spatiotemporal association caused by the positional vectors to enhance a spatial consistency during an inference, for example, the automotive perception. Accordingly, a determination of the spatiotemporal association in non-linear motion scenarios is explained with reference to FIG. 2B.

Figure 2B:
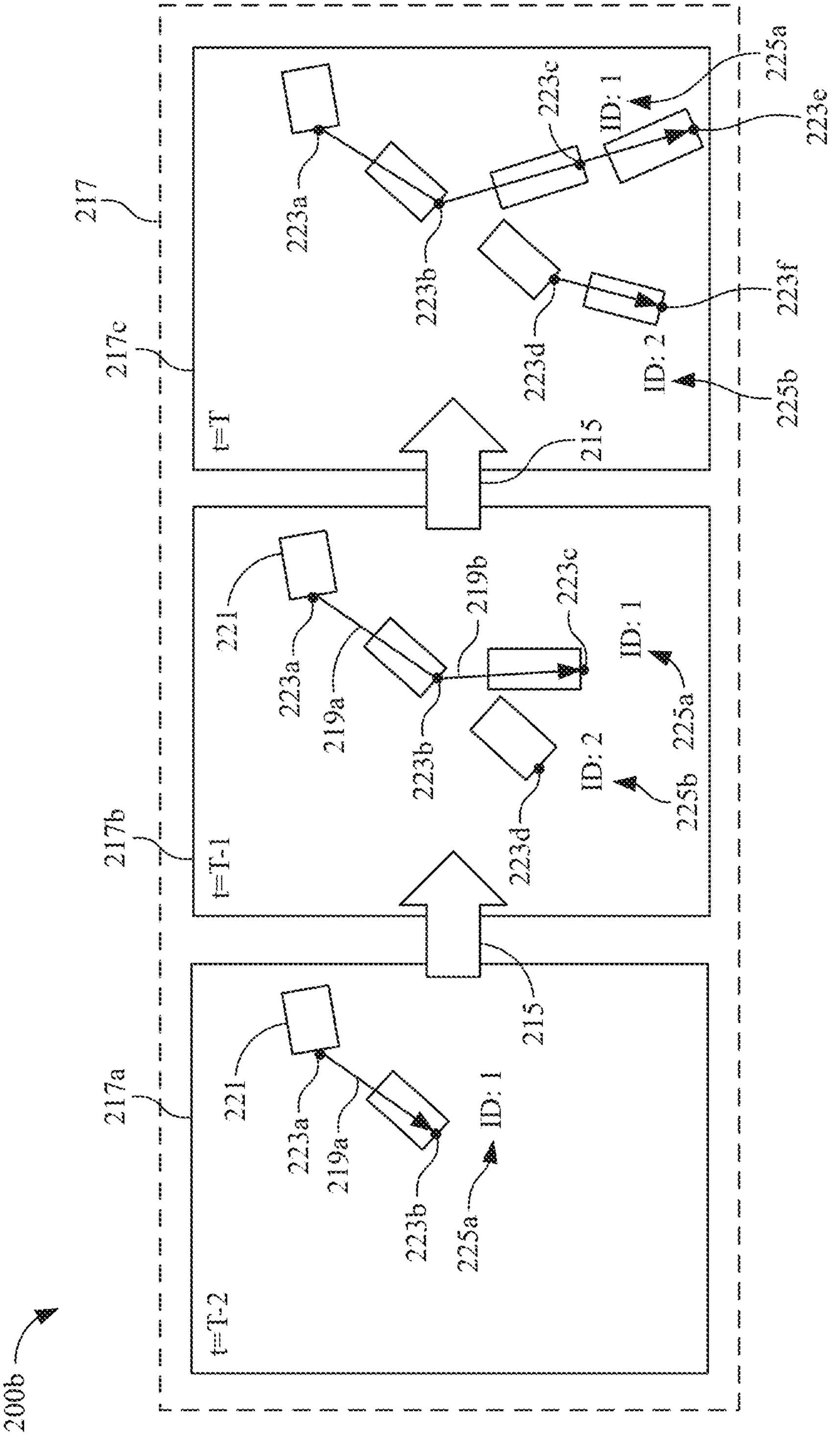
FIG. 2B illustrates a schematic of principles of determining a spatiotemporal association in a second exemplary sequence of radar images non-linear motion scenarios, according to an embodiment of the present disclosure.

FIG. 2B illustrates a schematic 200*b* of principles of determining a spatiotemporal association 215 in a second exemplary sequence of radar images 217, according to an embodiment of the present disclosure. The second exemplary sequence of radar images 217 includes a radar image 217*a*, a radar image 217*b*, and a radar image 217*c*.

Some embodiments are based on an objective to determine, based on features of the radar image 217*a* and features of the radar image 217*c*, a positional vector 219*a* indicative of a positional difference of an object 221 between a coordinate 223*a* and a coordinate 223*b* in the radar image 217*a*. Some embodiments are based on an objective to indicate a current position of the object 221 by using a current position identifier (ID: 1) 225*a*.

Some embodiments are based on an objective to determine, based on the features of the radar image 217*b*, a first set of predicted coordinates to determine a non-linear motion of the object 221. The first set of predicted coordinates includes a coordinate 223*c* and a coordinate 223*d*.

Some embodiments are based on an objective to determine, based on the features of the radar image 215*b* and the features of radar image 215*c*, a positional vector 219*b* indicative of a positional difference of an object 221 between the coordinate 223*b* and a coordinate 223*d* of the first set of predicted coordinate. Some embodiments are based on an objective to indicate a predicted position of the object 221 by using a predicted position identifier (ID: 2) 225*b*.

Some embodiments are based on an objective to determine, based on the features of the radar image 215*c*, a second set of predicted coordinates of the object 221 in the radar images 215*c*. The second set of predicted coordinates includes a coordinate 223*e* and a coordinate 223*f*.

Further, some embodiments are based on an objective to determine the spatiotemporal association 215 between the positional vector 219*a* and the positional vector 219*b*. Further, some embodiments are based on an objective to determine, based on the spatiotemporal association 215, a positional vector 219*c* indicative of a positional difference between the coordinate 223*c* and the coordinate 221*e* of the second set of predicted coordinates. Further, some embodiments are based on an objective to indicate the current object position of the object 221 in the radar image 217*c* by using the current position identifier (ID: 1) 225*a*.

Some embodiments are based on an objective to determine a positional vector 219*d* indicative of positional difference between the coordinate 221*d* and the coordinate 221*f*. Further, some embodiments are based on an objective to indicate the predicted object position of the object 221 in the radar image 217*c* by using the predicted position identifier (ID: 2) 225*b*. The determination of the positional vectors and the spatiotemporal association is further described with reference to FIG. 7, FIG. 8, FIG. 9, and FIG. 10.

Some embodiments are based on an objective to provide a radar system for radar object detection and tracking of the one or more objects 103 in the scene 101. Accordingly, the radar system for radar object detection and tracking is described with reference to FIG. 3.

Figure 3:
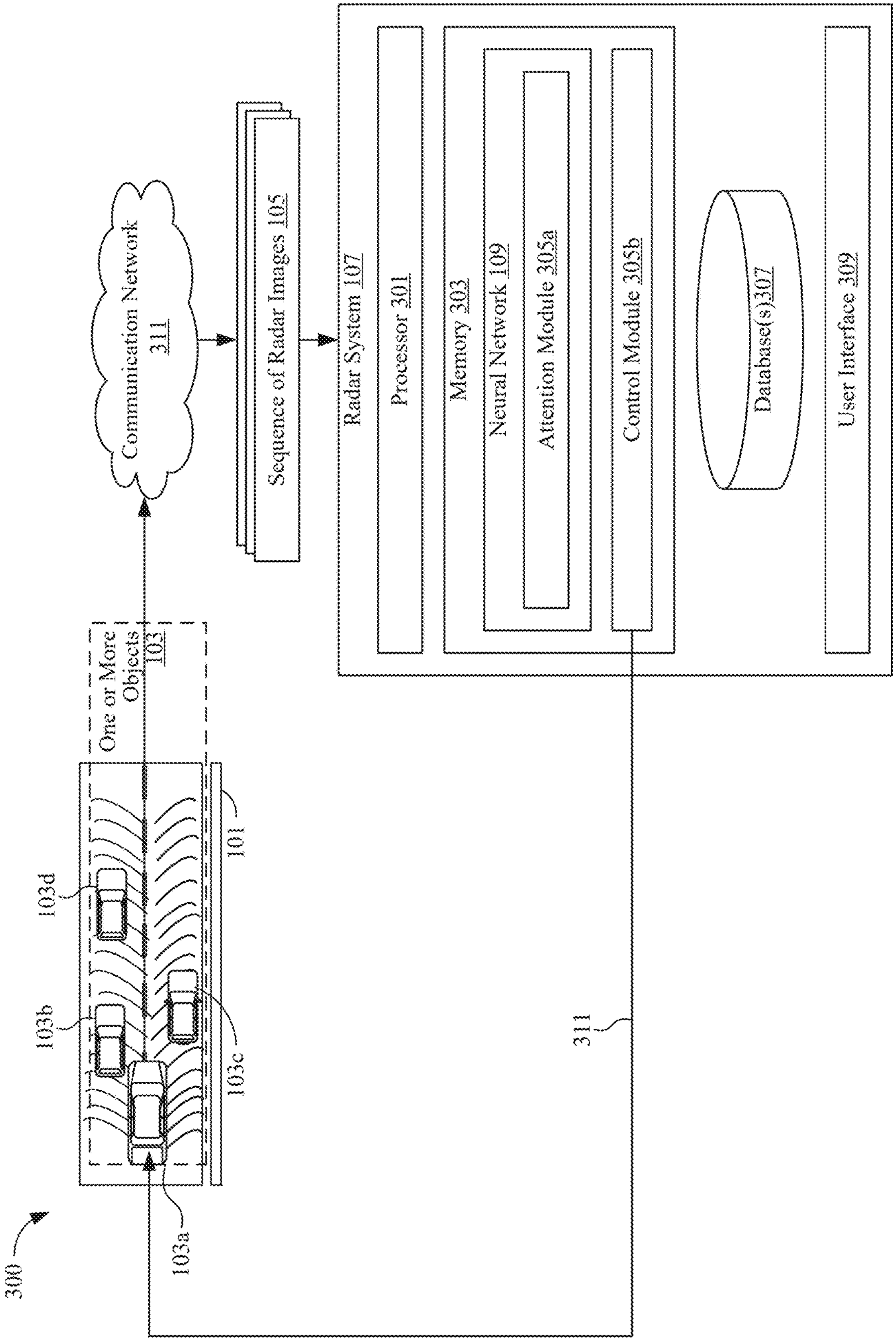
FIG. 3 illustrates a block diagram of a radar system for radar object detection and tracking of one or more objects, according to an embodiment of the present disclosure.

FIG. 3 illustrates a block diagram 300 of the radar system 107 for radar object detection and tracking of one or more objects 103, according to an embodiment of the present disclosure. As shown by FIG. 3, the radar system 107 is commutatively coupled to at least one object, for example, the object 103*a* in the scene 101 via the communication network 311. The radar system 107 includes a processor 301, a memory 303, a database 307, and a user interface 309. The memory 303 includes the neural network 109, and a control module 305*b*.

All the components of the radar system 107 and the one or more objects 103 in the scene 101 may be coupled directly or indirectly to the communication network 311. The communication network 311 may be wired, wireless, or any combination of wired and wireless communication networks, such as cellular, Wi-Fi, internet, local area networks, or the like. In some embodiments, the communication network 311 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof.

In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks (for e.g. LTE-Advanced Pro), 5G New Radio networks, ITU-IMT 2020 networks, code division multiple access (CDMA), wideband code division multiple access (WCDMA), wireless fidelity (Wi-Fi), wireless LAN (WLAN), Bluetooth, Internet Protocol (IP) data casting, satellite, mobile ad-hoc network (MANET), and the like, or any combination thereof. The components described in the radar system 107 may be further broken down into more than one component and/or combined together in any suitable arrangement. Further, one or more components may be rearranged, changed, added, and/or removed.

The radar system 107 includes suitable logic, circuitry, and interfaces that may be configured to detect and track the one or more objects 103 in the scene 101. Further, the radar system 107 is configured to control the one or more object 103, for example, the object 103*a* in the scene 101.

In some embodiments, the radar system 107 may be embodied as a chip or chip set. In other words, the system radar system 107 may comprise one or more physical packages (such as, chips) that includes materials, components and/or wires on a structural assembly (such as, a baseboard).

The neural network 109 include one or more modules, for example, an attention module 305*a* to perform one or more operations associated with the radar object detection and tracking. The one or more operations include, but are not limited to, feature extraction operations, attention mechanism operations, and relational modelling operations. The attention module 305*a* allows the neural network 109 to employ the attention mechanism 121 on the features of radar images of the sequence of radar images 105. In some embodiments, the attention mechanism 121 corresponds to an attention mechanism neural network. The employment of the attention mechanism 121 using the attention module 305*a* of the neural network 109 is explained in detail below in FIG. 5. In some embodiments, the attention module 305*a* may be decoupled with the neural network 109.

In an example embodiment, the neural network 109 is a convolutional neural network (CNN) with or without skip connections. For example, in one embodiment, the CNN is a deep convolutional neural network with skip connections for multi-scale feature extraction and ensemble. Such a CNN is advantageous because it can process the plurality of radar images based on their order. For example, the deep convolutional neural network can accept the sequence of radar images 105 stacked in a tensor to form a multi-channel radar image.

In some embodiments, the processor 301 is configured to collect a sequence of radar images 105. The plurality of radar images in the sequence of radar images 105 may be denoted as $I=I_1, \ldots, I_t, \ldots I_T \in {}^{T\times H\times W}$, where $I_t \in {}^{1\times H\times W}$ is a radar image, T is a number of radar images, H is a radar image height, and W is a radar image width.

Further, the processor 301 is further configured to obtain feature representations $Z_t$ of a consecutive radar image input ($I_{t,t-1}$) with a backbone function $\mathcal{F}_\theta(\bullet)$ as given below:

$$Z_t := \mathcal{F}_\theta(I_{t,t-1}) \tag{1}$$

where the consecutive radar image input ($I_{t,t-1}$) is a combination of a first radar image collected at a time t and a second radar image collected at a previous time t−1.

In some embodiments, the backbone function $\mathcal{F}_\theta$ is built with the neural network 109, for example, a residual network (ResNet) with shared model parameters θ. In an example embodiment, the neural network 109 is further configured to process, based on a determination that the time t is even, the first radar image collected at the time t followed by the second radar image collected at the previous time t−1 denoted by $I_{t,t-1}=\{I_t, I_{t-1}\}$. In another example embodiment, the neural network 109 is further configured to process, based on a determination that the time t is odd, the second radar image collected at the previous time t−1 followed by the first radar image collected at the time t denoted by $I_{t,t-1}=\{I_{t-1}, I_t\}$.

Further, in some embodiments, the obtained feature representations $Z_t$ correspond to a final representations of the features $$Z_t \in \mathbb{R}^{C\times\frac{H}{s}\times\frac{W}{s}},$$

where C is a number of channels and s is a down sampling ratio over a spatial dimension.

In some embodiments, the processor 301 is further configured to generate, using a filtering module, a heatmap to determine at least one property 117 of the one or more objects 103 in the scene 101. The filtering module is defined as:

$$\mathcal{G}_\theta^{hm}: \mathbb{R}^{C\times\frac{H}{s}\times\frac{W}{s}} \to \mathbb{R}^{1\times\frac{H}{s}\times\frac{W}{s}}: Z_t \mapsto Z_t^{hm} \tag{2}$$

where θ is a learnable parameter. Further, the filtering module is built with the neural network 109, for example, a fully connected neural network (FNN). In some embodiments, the processor 301 is further configured to apply a sigmoid function after the filtering module.

In some embodiments, the processor 301 is further configured to determine, using a head, the object width w and the object length h for each top-K features associated with the generated heatmap. The head is defined as:

$$\mathcal{G}_\theta^{b}: Z_t\left[P_t^{hm}\right] \mapsto (w, h) \tag{3}$$

where $$P_t^{hm}$$

is a set of coordinates defined as:

$$P_t^{hm} := \left\{(x, y) \,\middle|\, \mathcal{G}_\theta^{hm}(Z_t)_{xy} \geq \left[\mathcal{G}_\theta^{hm}(Z_t)\right]_K\right\}, \tag{4}$$

where $$\left[\mathcal{G}_\theta^{hm}(Z_t)\right]_K$$

is a K-th largest value in the $$\mathcal{G}_\theta^{hm}(Z_t)$$

over a spatial space $$\frac{H}{s}\times\frac{W}{s},$$

and a subscript xy is a taking value at coordinate (x, y).

Further, the processor 301 is further configured to determine, using the orientation head $$\mathcal{G}_\theta^{r}: Z_t\left[P_t^{hm}\right] \mapsto (\cos\vartheta, \sin\vartheta),$$

the object orientation $$\vartheta = \tan^{-1}\left(\frac{\sin\vartheta}{\cos\vartheta}\right).$$

Further, the processor 301 is further configured to determine, using an offset head, the object offsets $(o_x, o_y)$.

$$\mathcal{G}_\theta^{o}: Z_t\left[P_t^{hm}\right] \mapsto (o_x, o_y) \tag{5}$$

In an example embodiment, the control module **305*b* is configured to generate, based on the determined at least one property 117, a set of control commands 311 corresponding to the one or more objects 103 in the scene 101. In some embodiments, the control module 305*b* is further configured to compensate positional shifts associated with the one or more objects 103 in the scene 101 based on the determined at least one property 117 of the one or more objects 103 in the scene 101**.

In some embodiments, the memory 303 may be non-transitory and may include, for example, one or more volatile and/or non-volatile memories. In other words, for example, the memory 303 may be an electronic storage device (for example, a computer readable storage medium) comprising gates configured to store data (for example, bits) that may be retrievable by a machine (for example, a computing device like the processor 301). The memory 303 may be configured to store information, data, content, applications, instructions, or the like, for enabling the apparatus to conduct various functions in accordance with an example embodiment of the present disclosure. For example, the memory 303 may be configured to buffer input data for processing by the processor 301. As exemplarily illustrated in FIG. 3, the memory 303 may be configured to store instructions for execution by the processor 301. As such, whether configured by hardware or software methods, or by a combination thereof, the processor 301 may represent an entity (for example, physically embodied in circuitry) capable of performing operations according to an embodiment of the present disclosure while configured accordingly. Thus, for example, when the processor 301 is embodied as an ASIC, FPGA or the like, the processor 301 may be specifically configured hardware for conducting the operations described herein.

Alternatively, as another example, when the processor 301 is embodied as an executor of software instructions, the instructions may specifically configure the processor 301 to perform the algorithms and/or operations described herein when the instructions are executed. However, in some cases, the processor 301 may be a processor specific device (for example, a mobile terminal or a fixed computing device) configured to employ an embodiment of the present disclosure by further configuration of the processor 301 by instructions for performing the algorithms and/or operations described herein.

The processor 301 may include, among other things, a clock, an arithmetic logic unit (ALU) and logic gates configured to support operation of the processor 301.

In some embodiments, the radar system 107 includes the processor 301 for conducting processing functions associated with the radar system 107 and the database 307 for storing and retrieving the data. In an embodiment, the radar system 107 may comprise one or more processors configured to process requests received from the radar system 107. Further, in some embodiments, the database 307 comprises suitable logic, circuitry, and interfaces that may be configured to store the data associated with the one or more participants of the delivery services.

In some embodiments, the processor 301 is further configured to enhance collected features of each radar image in the sequence of radar images 105 by performing one or more operations in a temporal relation layer (TRL). According, a schematic of the TRL is provided with reference to FIG. 4A.

Figure 4A:
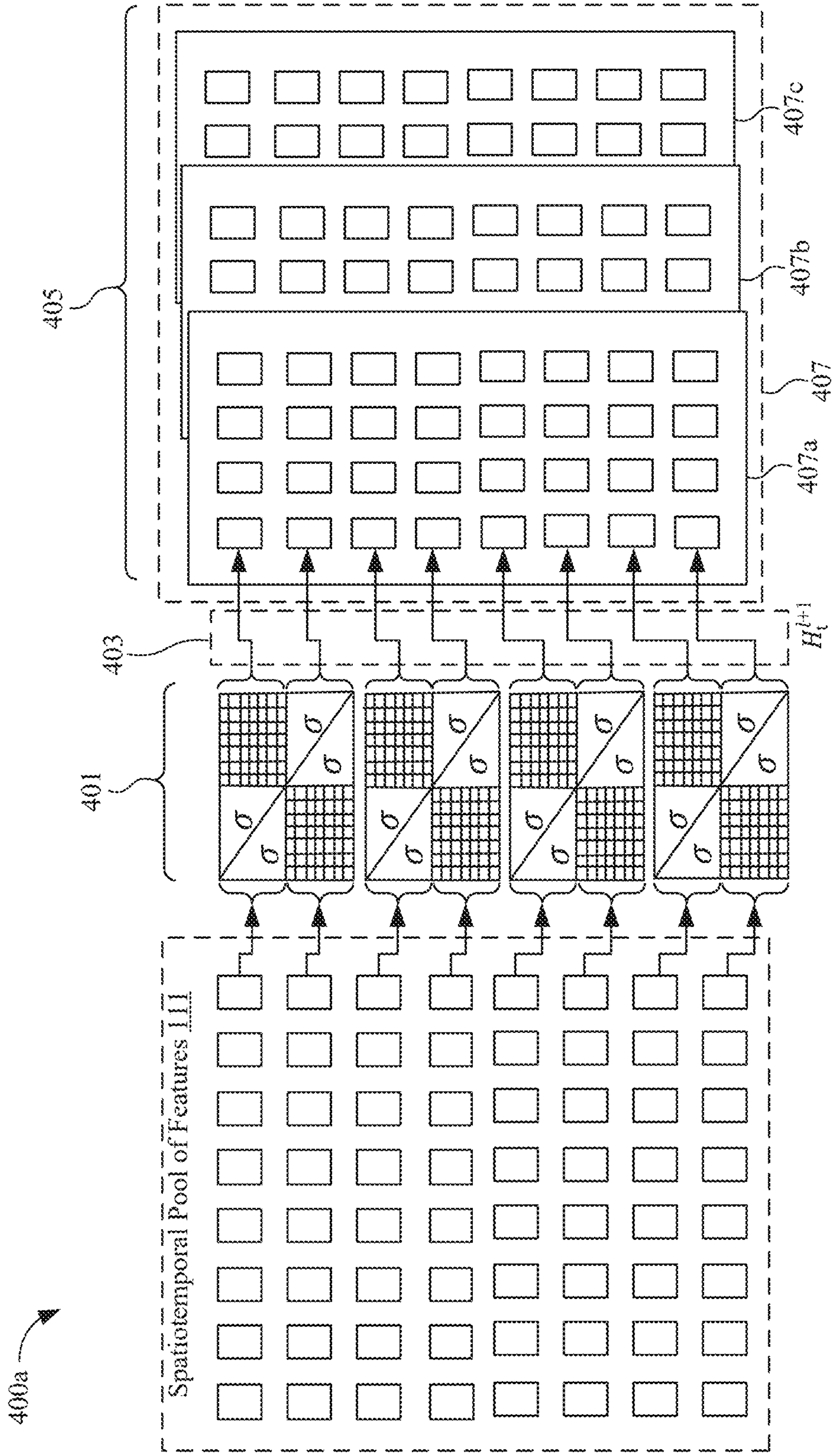
FIG. 4A illustrates a schematic for implementation of a temporal relational later (TRL), according to an embodiment of the present disclosure.

FIG. 4A illustrates a schematic 400*a* for implementation of aTRL 401, according to an embodiment of the present disclosure. As shown by FIG. 4A, the processor 301 is further configured to provide features of the spatiotemporal pool of features 111 to the TRL 401 for each two consecutive radar images in the sequence of radar images 105.

In some embodiments, the processor 301 is further configured to determine a selective top-K features matrix defined as:

$$H_t := Z_t\left[P_t^{pre-hm}\right] \in \mathbb{R}^{C\times K} \tag{6}$$

In some embodiments, the processor 301 is further configured to determine the selective top-K features matrix by providing the set of coordinates $$P_t^{pre-hm}$$

that are obtained from equation (4) to feature representations $Z_t$.

In some embodiments, the processor 301 is further configured to generate a concatenated matrix by performing a matrix concatenation denoted by $H_{t,t-1}:=\{H_t, H_{t-1}\}^T \in \mathbb{R}^{2K\times C}$. Further, the processor 301 is further configured to generate, the spatiotemporal pool of features 111 denoted by $$H_{t,t-1}^{pos} = \left\{H_{t,t-1}, P_{t,t-1}^{enc}\right\} \in \mathbb{R}^{2K\times(C+D_{pos})\}}$$

by performing a positional encoding denoted by $$P_t^{enc} = \varepsilon_\theta\left(P_t^{pre-hm}\right) \in \mathbb{R}^{K\times D_{pos}}.$$

In some embodiments, the processor 301 is further configured to apply, using the neural network 109, the positional encoding Ee before passing the concatenated matrix $H_{t,t-1}$ to the TRL 401.

In the TRL 401, the processor 301 is further configured to apply the attention mechanism 121. In some embodiments, the processor 301 is further configured to apply the attention mechanism 121 to incorporate a temporal inductive bias with a masking matrix M to each head. In some embodiments, the attention mechanism corresponds to a masked cross attention mechanism. The marked cross attention mechanism is defined as:

$$A(V, X) := S\left(\frac{M + q(X)k(X)^T}{\sqrt{d}}\right)v(V) \tag{7}$$

where S(•) is a softmax function, and q(•), k(•) and v(•) are linear transformation layers and are referred to as “query”, “keys” and “values”, respectively. Further, d is a dimension of the query and the keys is used to scale a dot product between the query and the keys.

Further, in some embodiments, in the TRL 401 of layer l, the processor 301 is further configured to process, using the neural network 109 employing the attention mechanism 121 denoted by $$A\left(H_{t,t-1}^{l}, H_{t,t-1}^{l,pos}\right),$$

the spatiotemporal pool of features 111. denoted by $$\left(H_t^{l+1}\right)$$

to generate a spatiotemporal pool of selected features 403. In some embodiments, the neural network 109 is configured to employ the attention mechanism 121 with a masking matrix $M_l$ defined as:

$$M_l := \begin{bmatrix} \mathbb{I}_K, & 1_K \\ 1_K & \mathbb{I}_K \end{bmatrix} + \sigma\left(\begin{bmatrix} 1_K & 0_K \\ 0_K & 1_K \end{bmatrix} - \mathbb{I}_{2K}\right) \tag{8}$$

where a block $II_K$ is an identity matrix of size K, $1_K$ and $0_K$ are an all-one matrix, and an all-zero matrix with a size K×K, respectively. Further, σ is a negative constant, for example, a value of $-10^{10}$. The negative constant σ ensures a near-zero value in an output of the softmax function.

In some embodiments, the processor 301 is further configured to disable, using diagonal blocks in the TRL 401, the attention mechanism 121, among features of a same radar image. Further, the processor 301 is further configured to allow, using off-diagonal blocks in the TRL 401, a cross image attention.

In some embodiments, the processor 301 is further configured to employ a window shifting mechanism 405, for example a window shifting technique employed in a Swin Transformer to generate the discrete spatiotemporal patches 113 to mitigate the computational complexity. Further, the window shifting mechanism 405 enables the connective attention across each time step. In some embodiments, the processor 301 is further configured to partition, using the neural network 109 employing the window shifting mechanism 405, the spatiotemporal pool of selected features 403 to generate a set of shifted windows 407 denoted by $$\Omega = \left\lfloor \left\lceil \frac{K}{S} \right\rceil - \frac{M}{S} \right\rceil + 1 \right\rfloor$$

The set of shifted windows include a shifted window 407*a*, a shifted window 407*b*, and a shifted window 407*c*. Further, in some embodiments, the processor 301 is further configured to employ the window shifting mechanism 405 with a stride $$S = \left\lfloor \frac{M}{2} \right\rfloor,$$

where $\lfloor\cdot\rfloor$ is a round function and $$M = \left\lfloor \frac{4K}{T} \right\rfloor$$

is a shifted window size.

In some embodiments, the processor 301 is further configured to process the set of shifted windows 407 in a connective temporal relation layer (CTRL) to generate the discrete spatiotemporal patches 113. The CTRL is configured to increase an inference performance and mitigate problems associated with a low signal-to-noise ratio (SNR) of radar images in the sequence of radar images 105. In some embodiments, the processor 301 is further configured to generate the discrete spatiotemporal patches 113 denoted by $$H^{l+1}_{t_{even,w}},$$

$$H^{l+1}_{t_{odd,w}} \in \mathbb{R}^{\frac{TM}{2}\times C}$$

corresponding to each shifted window of the set of shifted windows 407. In some embodiments, the processor 301 is further configured to generate the discrete spatiotemporal patches 113 denoted by $$H^{l+1}_{t_{even,w}},$$

$$H^{l+1}_{t_{odd,w}} \in \mathbb{R}^{\frac{TM}{2}\times C}$$

based on temporally indexed radar images associated with each shifted window of the set of shifted windows 407. According, a schematic of the CTRL is provided with reference to FIG. 4B.

Figure 4B:
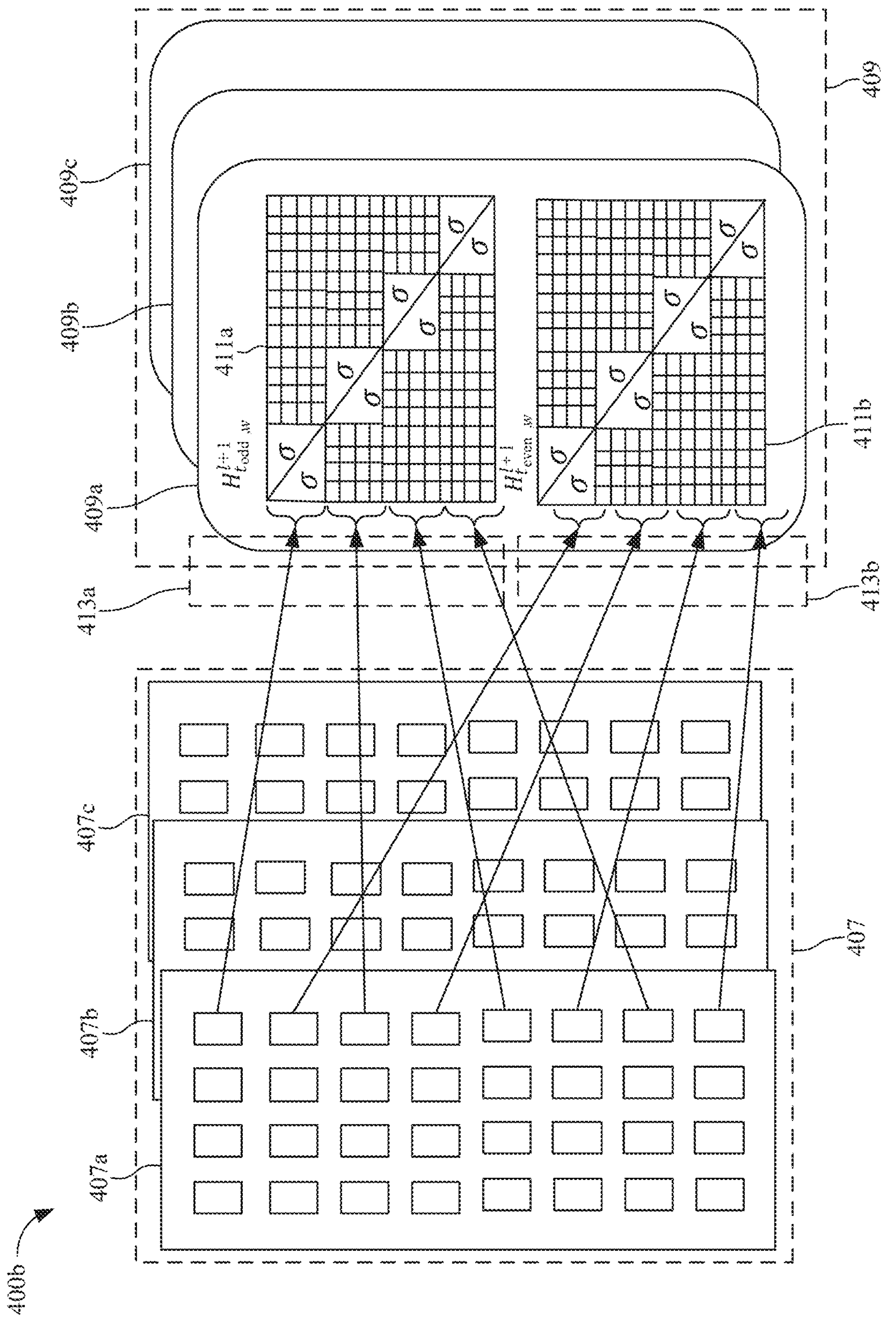
FIG. 4B illustrates a schematic for implementation of a connective temporal relation layer (CTRL) for generating discrete temporal patches, according to an embodiment of the present disclosure.

FIG. 4B illustrates a schematic for implementation of a connective temporal relation layer (CTRL) 409, according to an embodiment of the present disclosure. The CTRL 409 includes a CTRL 409*a*, a CTRL 409*b*, and a CTRL 409*c*. As shown by FIG. 4B, in the CTRL 409*a*, the processor 301 is further configured to generate the discrete spatiotemporal patches 113, for example, a discrete spatiotemporal patch 411*a* denoted by $$H^{l+1}_{t_{odd},407a}$$

and a discrete spatiotemporal patch 411*b* denoted by $$H^{l+1}_{t_{even},407a}$$

based on one temporally-indexed radar images 413*a* and the even indexed radar images another temporally-indexed radar images 413*b* associated with the shifted window 407*a*, respectively. In some embodiments the one temporally indexed radar images may be referred to as "even indexed radar images". Further, in some embodiments, the another temporally-indexed radar images may be referred to "even indexed radar images".

Further, the processor 301 is further configured to generate a discrete spatiotemporal patch $$H^{l+1}_{t_{odd},407b}$$

and a discrete spatiotemporal patch $$H^{l+1}_{t_{even},407b}$$

based on the one temporally indexed radar images and the another temporally indexed radar images associated with the overlapping window 407*b*, respectively.

Further, the processor 301 is further configured to generate a discrete spatiotemporal patch $$H^{l+1}_{t_{odd},407c}$$

and a discrete spatiotemporal patch $$H^{l+1}_{t_{even},407c}$$

based on the one temporally indexed radar images and the another temporally indexed radar images associated with the shifted window 407*c*, respectively.

The processor 301 is configured to generate the discrete spatiotemporal patches 113 to reduce the computational complexity associated with a size of the attention mechanism 121 denoted by $$\frac{TM}{2} \times \frac{TM}{2} \sim 2K \times 2K$$

and increase the scalability over the long time horizon.

In some embodiments, the processor 301 is further configured to process, using the neural network 109 employing the attention mechanism 121 iteratively, the discrete spatiotemporal patches 113 to generate a spatiotemporal pool of updated features. Accordingly, a schematic is provided for determination of the spatiotemporal pool of updated features with reference to FIG. 4C.

Figure 4C:
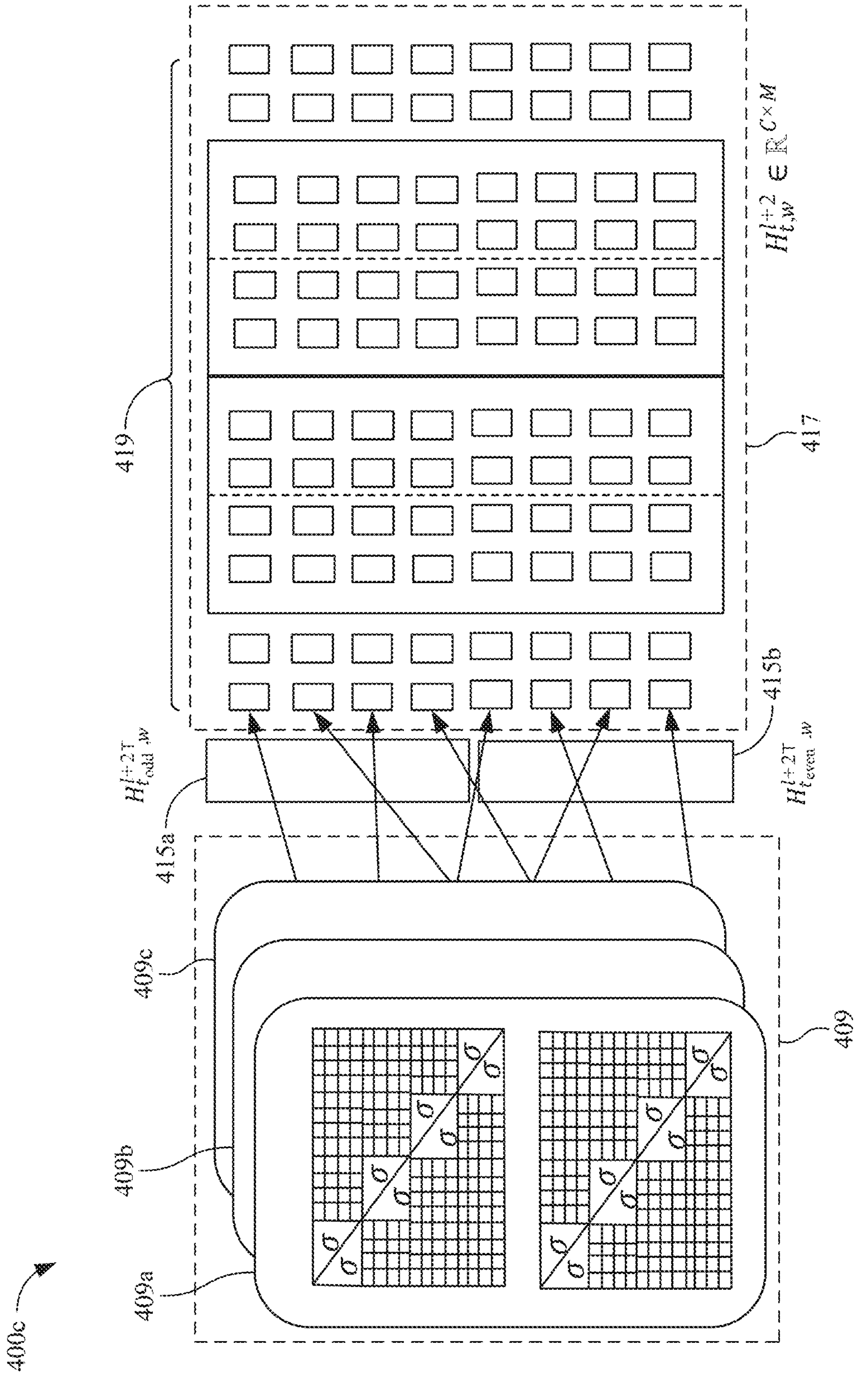
FIG. 4C illustrates a schematic for implementation of the CTRL for generating a spatiotemporal pool of updated features, according to an embodiment of the present disclosure.

FIG. 4C illustrates a schematic 400*c* for implementation of the CTRL 409 for generating a spatiotemporal pool of updated features 417, according to an embodiment of the present disclosure. As shown by FIG. 4C, in the CTRL layer 409, the processor 301 is further configured to apply the attention mechanism 121 denoted by $$A\left(H^{l+1}_{t_{even/odd,w}}, H^{l+1,pos}_{t_{even/odd,w}}\right)$$

to each discrete spatiotemporal patch to generate the spatiotemporal pool of updated features 417 denoted by $$H_{t,w}^{l+2} \in \mathbb{R}^{C \times M}.$$

Additionally or alternatively, the processor 301 is further configured to apply the attention mechanism 121 with a matrix $M_{l+1}$ defined as:

$$M_{l+1} := B + \sigma(\overline{B}) \text{ s.t. } B = \begin{bmatrix} \mathbb{I}_M & \cdots & 1 \\ \vdots & \ddots & \vdots \\ 1 & \cdots & \mathbb{I}_M \end{bmatrix} \tag{9}$$

In some embodiments, the processor 301 is further configured to determine a set $\overline{\text{B}}$ by changing values of 1 within a set B to 0, while simultaneously inverting the values of 1 to 0. The processor 301 is further configured to apply a feed-forward function that includes two linear layers, a normalization layer and a shortcut on features. The processor 301 is further configured to perform a relational modeling within multiple layers of the TRL 401 and CTRL 409 to determine the spatiotemporal pool of updated features 417 denoted by $$H_{t,w}^{l+2} \in \mathbb{R}^{C \times M}$$

by dividing features of the odd indexed features 415*a* denoted by $$H_{t_{odd},w}^{l+2\top}$$

and features of the even indexed features 415*b* denoted by $$H_{t_{even},w}^{l+2\top}.$$

Some embodiments are based on an objective to mitigate an overlapping 419 in the spatiotemporal pool of updated features 417. In some embodiments, the overlapping 419 may be caused due to an application of the window shifting mechanism 405. Hence, in a merging operation layer, the processor 301 is further configured to apply a window merging operation corresponding to overlapped positions of each shifted window associated with the spatiotemporal pool of updated features 417. The window merging operation may include, but are not limited to, a maximization operation, a summation operation, and a mean operation. Accordingly, a schematic of a merging operation layer is provided with reference to FIG. 4D.

Figure 4D:
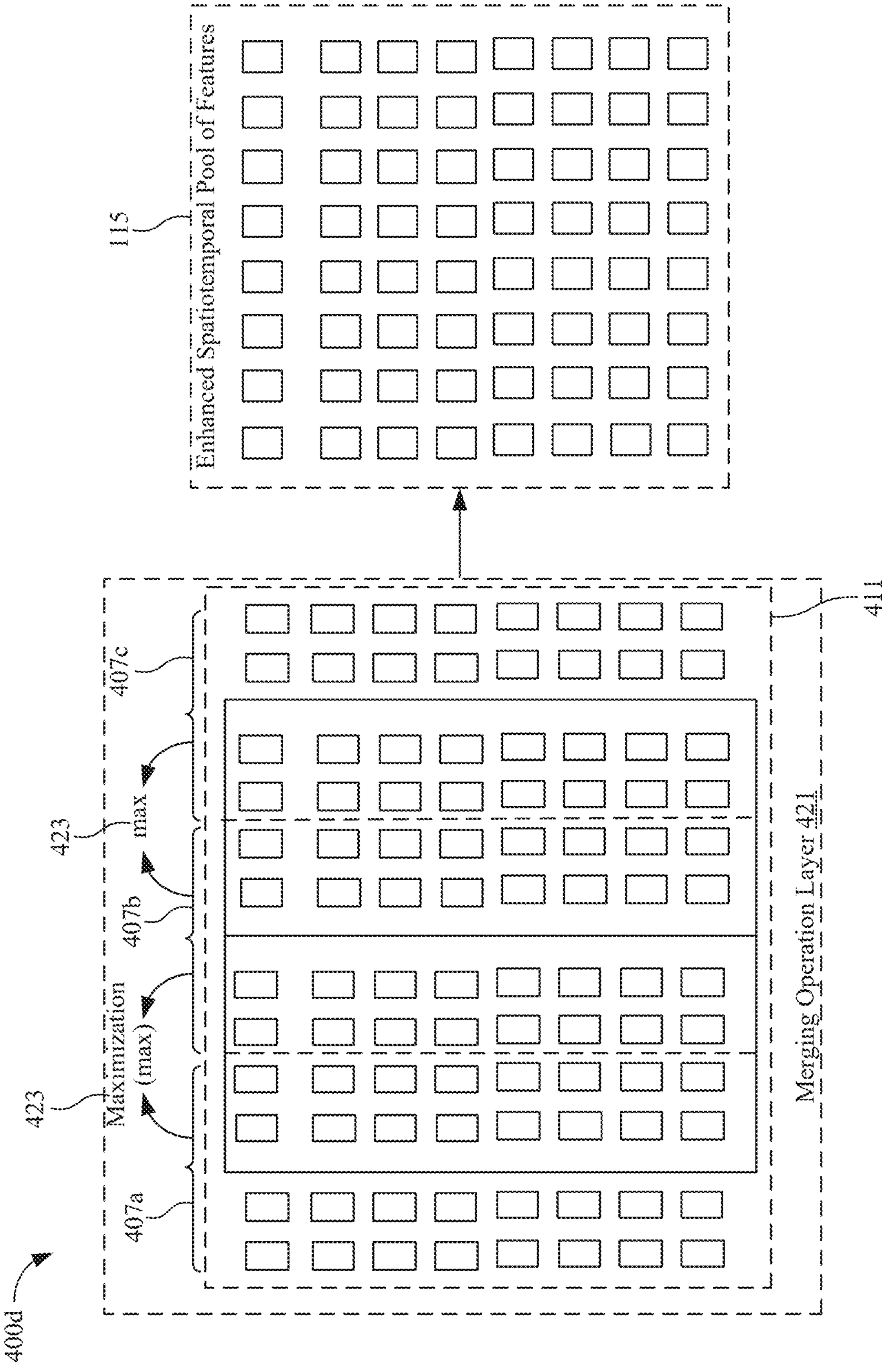
FIG. 4D illustrates a schematic for implementation of a merging operation layer for generating an enhanced spatiotemporal pool of features, according to an embodiment of the present disclosure.

FIG. 4D illustrates a schematic 400*d* for implementation of a merging operation layer 421, according to an embodiment of the present disclosure. As shown by FIG. 4D, in the merging operation layer 421, the processor 301 is further configured to apply a maximization (max) operation 423 corresponding to overlapped positions of each shifted windows, for example, the shifted window 407*a*, the shifted window 407*b*, and the shifted windows 407*c* to generate the spatiotemporal pool of enhanced features 411.

In an example embodiment, the processor 301 is further configured to apply a max operation 423 corresponding to each overlapped positions of the shifted window 407*a* and the shifted window 407*b* to mitigate a first overlapping between the shifted windows 407*a* and the shifted window 407*b*.

In an example embodiment, the processor 301 is further configured to apply the maximization (max) operation 423 corresponding to each overlapped positions of the shifted window 407*b* and the shifted window 407*c* to mitigate a second overlapping between the shifted windows 407*b* and the shifted window 407*c*.

Figure 5:
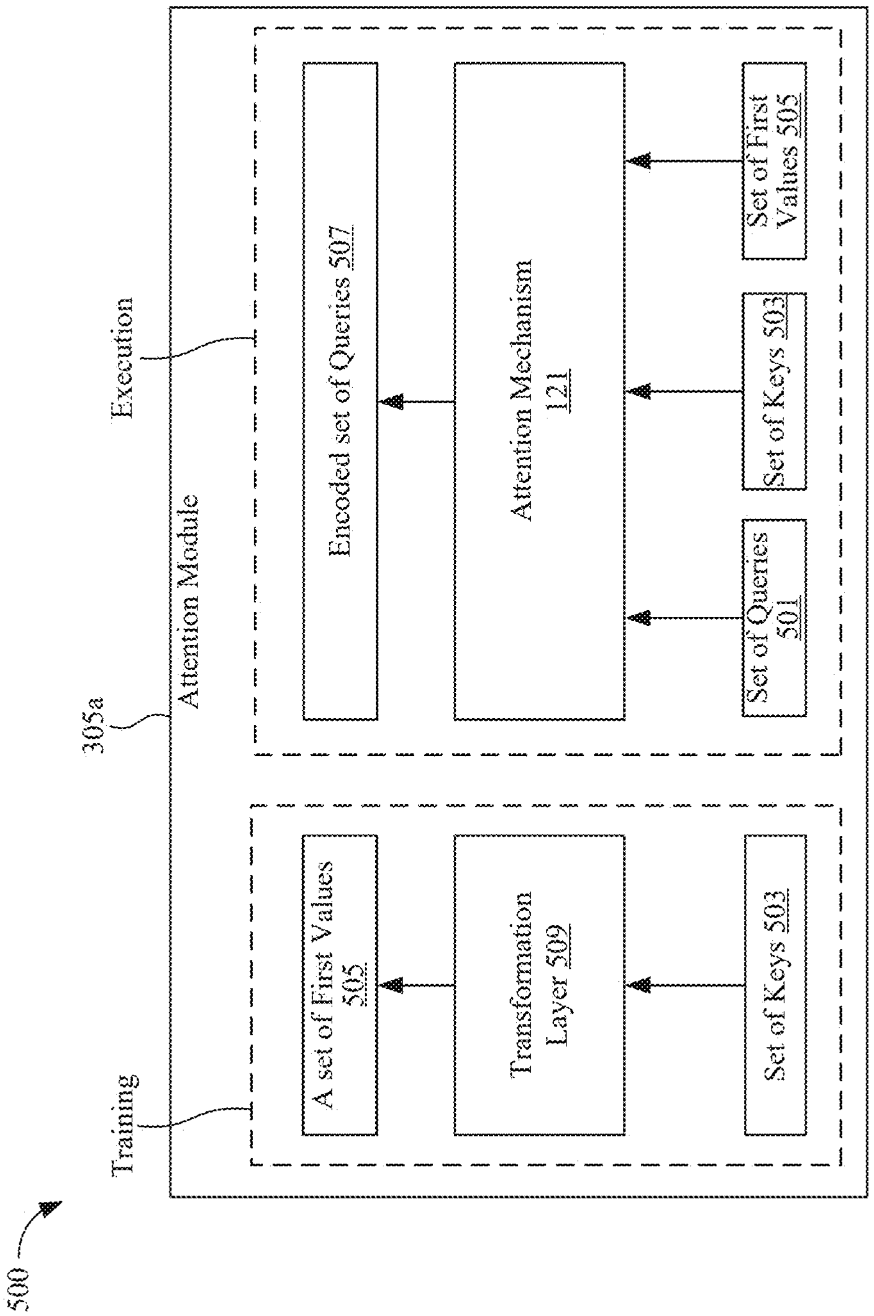
FIG. 5 illustrates a block diagram of an attention module, according to an embodiment of the present disclosure.

FIG. 5 illustrates a block diagram 500 of the attention module 305*a*, according to an embodiment of the present disclosure. FIG. 5 illustrates a block diagram 500 of the attention module 305*a*. The attention model includes the attention mechanism 121 and a transformation layer 509.

The transformation layer 509 transforms a set of keys 503 which are multi-dimensional into lower dimensional set of first values 505. In other words, the set of keys 503 are encoded in the latent spaces as the set of first values 505 in the transformation layer 509. Since, the set of keys 503 is associated with the normal operation of the radar system 107, the encoding of the set of keys 503 into the set of first values 505 may be done during training of the attention module 305*a*. In one embodiment, the encoding of the set of keys 503 into the set of first values 505 may be done by the neural network 109, for example, an autoencoder neural network. The autoencoder neural network may capture essential elements of a key and encode the key into a first value based on the captured elements in an unsupervised manner. Further, the pair of the set of keys 503 and the set of first values 505 is stored in the memory 303.

While the set of keys 503 may be encoded into the set of first values 505 during a training period of the attention module 305*a*, a set of queries 501 may be transformed into an encoded set of queries 507 during an execution period of the attention module 305*a*.

The execution period is defined as a period of execution of the current operation of the radar system 107. Further, each of the set of queries 501 is encoded based on a weighted corresponding first value of the set of first values 505 weighted with a corresponding attention weight of a plurality of attention weights to produce an encoding of each extended state of a sequence of extended states in a latent space. To that end, the attention mechanism 121 receives the set of keys 503 and the set of first values 505 from the memory 303. In addition to that, the attention mechanism 121 receives the set of queries 501 associated with the current operation of the radar system 107 based on a sequence of control inputs and a sequence of outputs of the radar system 107 recorded by one or more sensors, for example, the radar. The attention mechanism 121 is configured to process the set of queries 501, the set of keys 503, and the set of first values 505 to encode each query of the set of queries 501 to the latent space. This encoding reduces the dimension of the set of queries 501, for example, ten-dimensional query may be transformed into two-dimensional query in the embedded space or the latent space.

Figure 6:
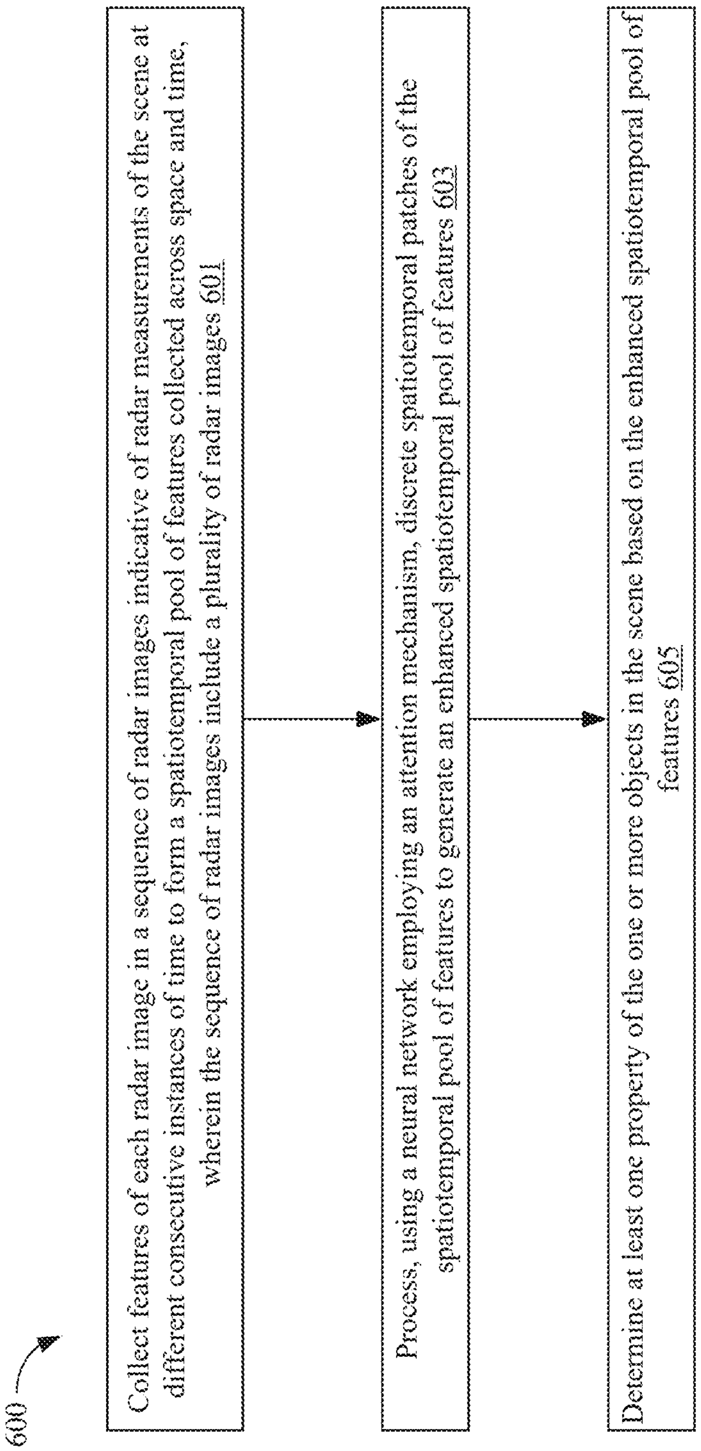
FIG. 6 illustrates a flowchart for radar object detection and tracking of the one or more objects, according to an embodiment of the present disclosure.

FIG. 6 illustrates a flowchart of a method 600 for radar object detection and tracking of one or more objects 107, in accordance with an example embodiment. In one or more embodiments, the radar system 107 may perform one or more portions of the method 600 and may be implemented in, for instance the processor 301. As such, the radar system 107 may provide means for accomplishing embodiments of other process described herein in conjunction with other components of the radar system 107. In an example embodiment, the processor 301 is further configured to cause the radar system 107 for accomplishing embodiments of other process described herein in conjunction with other components of the radar system 107. Although the method 600 is illustrated as a sequence of steps, its contemplated that various embodiments of the method 600 may be performed in any order or combination and need not include all of the illustrated steps.

At block 601, the features of each radar image in the sequence of radar images 105 are collected. Further, the features are indicative of radar measurements of the scene 101 at different consecutive instances of time to form the spatiotemporal pool of features 111 collected across space and time. Additionally or alternatively, the sequence of radar images 105 includes the plurality of radar images. In some embodiments, the processor 301 is further configured to form the spatiotemporal pool of features 111 based on denoted by $$H_{t,t-1}^{pos} = \{H_{t,t-1}, P_{t,t-1}^{enc}\} \in \mathbb{R}^{2K\times(C+D_{pos})\}}$$

by performing positional encoding denoted by $$P_t^{enc} = \varepsilon_\theta(P_t^{pre-hm}) \in \mathbb{R}^{K\times D_{pos}}.$$

At block 603, the discrete spatiotemporal patches 113 are processed to generate the enhanced spatiotemporal pool of features 115. In some embodiments, the neural network 109 is further configured to employ the attention mechanism 121 on the discrete spatiotemporal patches 113 to generate the enhanced spatiotemporal pool of features 115. Additionally, or alternatively, the discrete spatiotemporal patches 113 based on the even indexed frame images and odd indexed frame images.

At block 605, the at least one property 117 of the one or more objects 103 in the scene 101 is determined. In some embodiments, the at least one property 117 of the one or more objects 103 in the scene 101 is determined based on the enhanced spatiotemporal pool of features 115. Additionally or alternatively, the processor 301 is further configured to generate the set of control commands 311 to control the one or more objects 103 in the scene 101.

Some embodiments are based on an objective to increase a temporal consistency of the one or more objects 103 in the scene 101 by generalizing the TRL 401 from the two consecutive radar images to multiple inter-radar images with the temporally regrouped window attention for scalability. Further, some embodiments are based on an objective to increase a spatial consistency by determining the positional vectors and the association between the positional vectors. According a schematic for radar object detection and tracking of the one or more objects 103 is provided with reference to FIG. 7.

Figure 7:
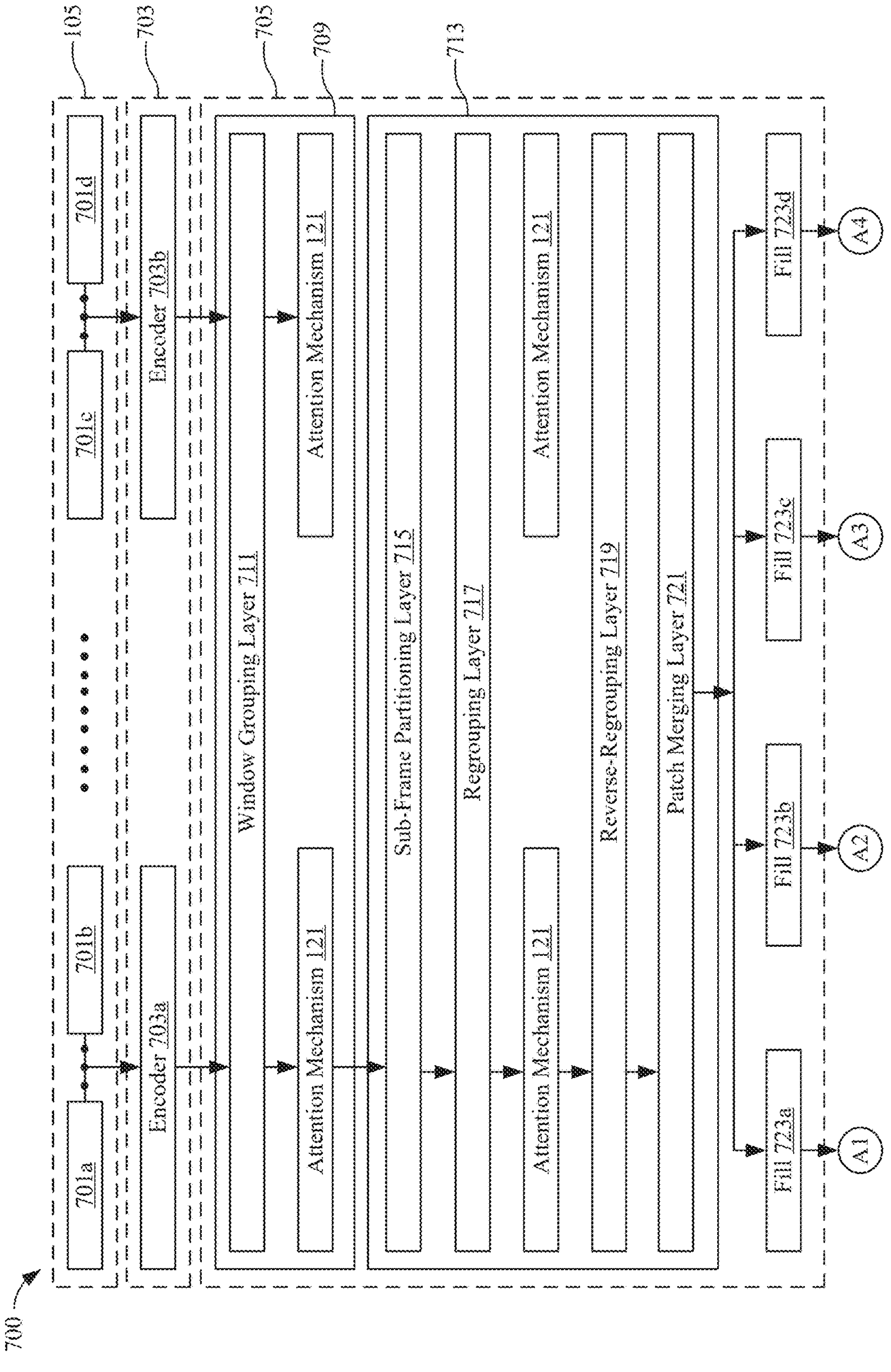
FIG. 7 illustrates a schematic for radar object detection and tracking of the one or more objects, according to an embodiment of the present disclosure.
Figure 7:
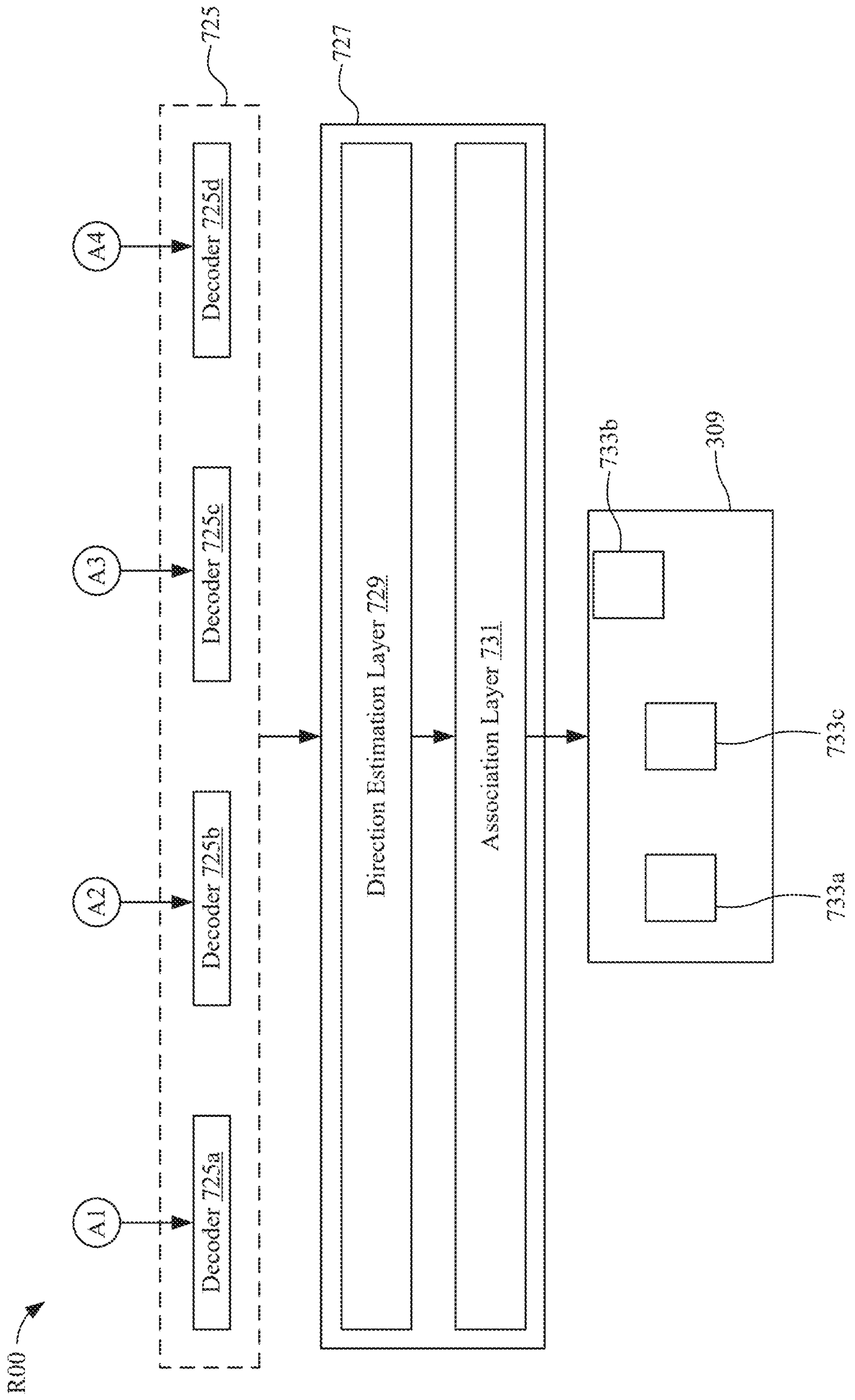

FIG. 7 illustrates a schematic 700 for radar object detection and tracking of the one or more objects 103, according to an embodiment of the present disclosure. The schematic include a sequence of radar images 105, a plurality of encoders 703, an extended temporal relation layer (ETRL) 705, a plurality of decoders 725, a control layer 727. Further, the sequence of radar images 105 includes a radar image 701*a*, a radar image 701*b*, a radar image 701*c*, and a radar image 701*d*.

The ETRL 705 include a temporal window attention layer (TWAL) 709, a temporally regrouped window attention layer (TRWAL) 713. Further, the TWAL 709 includes a window grouping layer 711. Further, the TRWAL 713 includes a sub-frame partitioning layer 715, a regrouping layer 717, a reverse-regrouping layer 719, and a patch merging layer 721.

The processor 301 is further configured to employ the plurality of encoders 703, for example, an encoder 703*a*, and an encoder 703*b* to obtain the feature representations $Z_t$ corresponding to the radar images of the sequence of radar images 105. For example, the encoder 703*a* is configured to obtain the feature representation $Z_t$ of the radar image 701*a* and the radar image 701*b*. Further, the encoder 703*b* is configured to obtain the feature representation $Z_t$ of the radar image 703*c* and the radar image 703*d*.

The TWAL 709 is configured to receive the feature representations $Z_t$ from the plurality of encoders 703. In the TWAL 709, the processor 301 is further configured to generate a set of temporal windows denoted by t, t−1, . . . , t−U+1 based on the radar images in the sequence of radar images 105. The processor 301 is further configured to permute an order associated with radar images in the sequence of radar images 105 to generate concatenated sequences of permutated radar images corresponding to each temporal windows of the set of temporal windows. The processor 301 is further configured to collect features for the concatenated sequences of permuted radar images corresponding to each temporal window of the set of temporal windows to generate the spatiotemporal; pool of features 111.

In some embodiments, the processor 301 is further configured to collect the features for the concatenated sequences of permutated radar images with the backbone function $\mathcal{F}_\theta$ as defined below:

$$Z_t := \mathcal{F}_\theta(I_{t,t-1,\ldots,t-U+1}), \tag{10a}$$

$$Z_{t-1} := \mathcal{F}_\theta(I_{t-1,t-2,\ldots,t-U+1,t}), \ldots , \tag{10b}$$

$$Z_{t-U+1} := \mathcal{F}_\theta(I_{t-U+1,t,t-1,\ldots,t-U+2}) \tag{10c}$$

where, U is a number of radar images in a temporal window. In some embodiments, the processor 301 is further configured to determine, based on a determination that the number of radar image is equal to two, the top-K features selectors $H_t$. Further, in some embodiment, the processor 301 is further configured to determine, using a top-K features selectors, for example, the TRL 401, the selective top-K features matrix defined as:

$$H_t := S_K(Z_t), \quad t = \{t, t-1, \ldots , t-U+1\} \tag{11}$$

In some embodiments, the processor 301 is further configured to collect features for the concatenated sequences of permutated radar images corresponding to each temporal window to generate the spatiotemporal pool of features 111 denoted as $$H_{t,\ldots,t-U+1}^{l-1} = [H_t^{l-1}, \ldots , H_{t-U+1}^{l-1}]^\top,$$

where the super index T is a layer index in the ETRL 705.

Further, in an example embodiment, the processor 301 is configured to provide the selective top-K features matrix $H_t$ to a first layer denoted by $$H_t^0$$

in the TWAL 709.

In some embodiments, the processor 301 is further configured to process, using the neural network 109 employing the attention mechanism 121, the spatiotemporal pool of features denoted by $$H^{l-1}_{t,\ldots,t-U+1} = \left[H_t^{l-1}, \ldots, H^{l=1}_{t-U+1}\right]^\top,$$

within each temporal window to generate a first set of enhanced spatiotemporal patches of features denoted by $$H_t^l, \ldots, H^l_{t-\tau+1}$$

corresponding to each radar image in the sequence of radar images 105.

Further, in the sub-frame partitioning layer 715, the processor 301 is further configured to partition each enhanced spatiotemporal patches of the first set of enhanced spatiotemporal patches of features $$H^{l-1}_{t,\ldots,t-U+1} = \left[H_t^{l-1}, \ldots, H^{l-1}_{t-U+1}\right]^\top$$

to generate a spatiotemporal pool of subset features denoted by $$H_t^l[\omega] \in \mathbb{R}^{C\times M},$$

ω=1, . . . , Ω within each temporal window. In some embodiments, the processor 301 is further configured to partition each enhanced spatiotemporal patches of the first set of enhanced spatiotemporal patches of features $$H^{l-1}_{t,\ldots,t-U+1} = \left[H_t^{l-1}, \ldots, H^{l-1}_{t-U+1}\right]^\top$$

with the stride S. Further, each enhanced spatiotemporal patch includes M features. In an example embodiment, the processor 301 is configured to perform, based on a determination that the top-K features are even, a non-overlapping sub-frame partitioning that includes M=K/2 features with a stride S=K/2. In another embodiment, the processor 301 is further configured to perform an overlapping partitioning by selecting the stride S lesser than the M features.

Further, in the regrouping layer 717, the processor 301 is further configured to generate an updated set of temporal windows by applying a re-grouping operation on each subset features of the spatiotemporal pool of subset features.

Further, the processor 301 is further configured to process, using the neural network 109 employing the attention mechanism 121, each subset features within each temporal window of the set of temporal windows denoted by $$F_t^l(\omega) = \left\{H_t^l[\omega], H^l_{t-U}[\omega], \ldots, H^l_{t-T+U}[\omega]\right\}^\top$$

to generate a second set of enhanced spatiotemporal patches of features for each temporal window of the updated set of temporal windows.

Further, in the reverse-regrouping layer 719, the processor 301 is further configured to process, each spatiotemporal patch of the second set of enhanced spatiotemporal patches with a reverse re-grouping operation to generate a set of updated spatiotemporal sub patches.

Further, in the patch merging layer 721, the processor 301 is further configured to process, each updated spatiotemporal sub patch of the set of updated spatiotemporal sub patches with the window merging operation denoted by $\mathcal{M}$ $$\left\{H_t^{l+1}[1], \ldots, H_t^{l+1}[\Omega]\right\}$$

to generate the enhanced spatiotemporal pool of features 115 denoted by $$H_t^{l+1}.$$

Further, in the ETRL 705, the processor 301 is further configured to fill back the enhanced spatiotemporal pool of features 115 denoted by $$H_t^{l+1}$$

to the feature representations associated with the radar images in the sequence of radar images 105 at corresponding spatial coordinates. Further, the processor 301 is further configured to feed the feature representations to the plurality of decoders 725. In an example embodiment, the processor 301 is further configured to fill 723*a* the enhanced spatiotemporal pool of features 115 to a feature representation $Z_{t-3}$ associated with the radar image 701*a*. Further, the processor 301 is further configured to provide the feature representation $Z_{t-3}$ to the decoder 725*a* to determine the at least one property 117 of the one or more objects 103 corresponding to a time t−3.

In an example embodiment, the processor 301 is further configured to fill 723*b* the enhanced spatiotemporal pool of features 115 to a feature representation $Z_{t-2}$ associated with the radar image 701*b*. Further, the processor 301 is further configured to provide the feature representation $Z_{t-2}$ to the decoder 725*b* to determine the at least one property 117 of the one or more objects 103 corresponding to a time t−2.

In an example embodiment, the processor 301 is further configured to fill 723*c* the enhanced spatiotemporal pool of features 115 to a feature representation $Z_{t-1}$ associated with the radar image 701*c*. Further, the processor 301 is further configured to provide the feature representation $Z_{t-1}$ to the decoder 725*c* to determine the at least one property 117 of the one or more objects 103 corresponding to a time t−1.

In an example embodiment, the processor 301 is further configured to fill 723*d* the enhanced spatiotemporal pool of features 115 to a feature representation $Z_t$ associated with the radar image 701*d*. Further, the processor 301 is further configured to provide the feature representation $Z_t$ to the decoder 725*d* to determine the at least one property 117 of the one or more objects 103 corresponding to a time t.

Further, in some embodiments, the plurality of decoders 725 are configured to output, based on each enhanced feature of the enhanced spatiotemporal pool of features, one or more visual indicators to indicate the determined at least one property 117 of the one or more objects 103 in the scene 101. In an example embodiment, the one or more visual indicators correspond to one or more bounding boxes.

Further, in the direction estimation layer 729, the processor 301 is further configured to determine, based on each feature of the enhanced spatiotemporal of features 115, positional vectors to indicative of a positional difference associated with the one or more objects 103 in the sequence of the radar images 105.

Further, in the association layer 731, the processor 301 is further configured to determine an association associated with the positional vectors. In some embodiments, the processor 301 is further configured to genera Further, the processor 301 is configured to display a respective bounding box corresponding to a respective object in the scene 101. For example, the processor is configured to display a bounding box 733*a*, a bounding box 733*b*, and a bounding box 733*c* corresponding to the object 103*a*, the object 103*b*, and the object 103*c*, respectively with the user interface 309.

Some embodiments are based on an objective to determine the positional vectors to improve a motion consistency during training. It is essential to address scenarios where objects move significantly within just one frame due to low frame rates and ego-vehicle motions.

Figure 8:
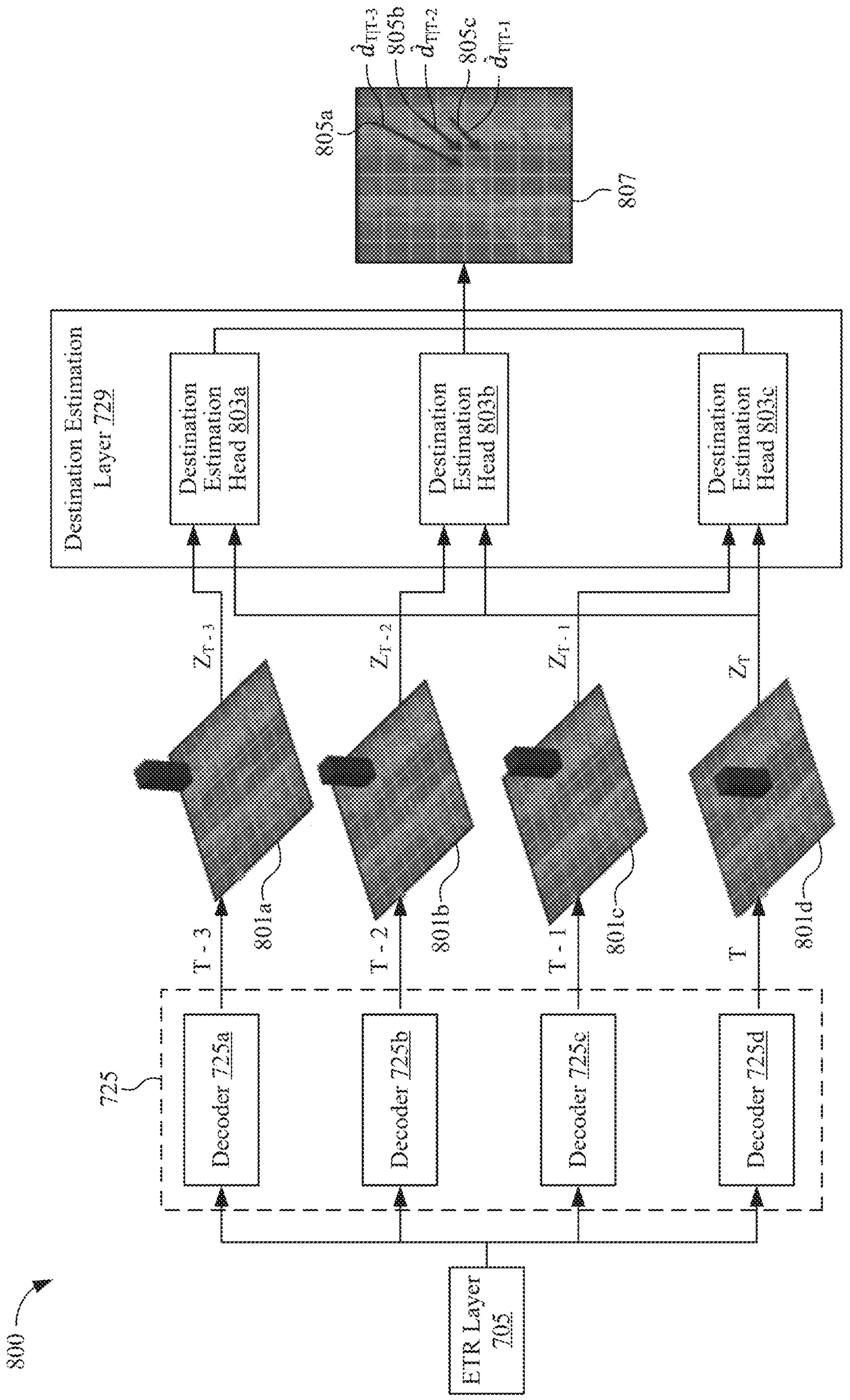
FIG. 8 illustrates a schematic for implementation of a direction estimation layer for determining positional vectors, according to an embodiment of the present disclosure.

FIG. 8 illustrates a schematic 800 for implementation for a direction estimation layer 729 for determining positional vectors, according to an embodiment of the present disclosure. As shown by FIG. 8, the processor 301 is further configured to provide an output of the ETR 705 to the plurality of decoders 725. The output of the ETR 705 includes enhanced spatiotemporal pool of features 115 corresponding to the sequence of radar image 105. In some embodiments, the processor 301 is further configured to generate feature maps, using the plurality of decoders 725 based on the enhanced spatiotemporal pool of features 115. For example, the processor 301 is further configured to generate, using the decoder 725*a*, a feature map 801*a* corresponding to the radar image 701*a* collected at time T−3. The processor 301 is further configured to generate, using the decoder 725*b*, a feature map 801*b* corresponding to the radar image 701*b* collected at time T−2. The processor 301 is further configured to generate, using the decoder 725*c*, a feature map 801*c* corresponding to the radar image 701*c* collected at time T−1. The processor 301 is further configured to generate, using the decoder 725*d*, a feature map 801*d* corresponding to the radar image 701*d* collected at time T.

Further, the processor 301 is further determined, based on each enhanced spatiotemporal pool of features, the positional vectors to indicate of a positional difference associated with the one or more objects 103 in the sequence of radar images 105. In some embodiments, the positional vectors indicate a current object position in a current radar image from each of the previous radar images in the sequence of radar images 105. In some embodiments, the processor 301 is further configured to determine, using a decoder head with learnable parameters, the positional vectors. The decoder head may iteratively refine object positions between the radar images during learning.

In some embodiments, the processor 301 is further configured to determine, using the decoder head $$\mathcal{G}_\theta^{DEst}$$

(•) with the learnable parameters θ, a τ-step positional vectors $\hat{d}_{T|T-\tau}$ from the previous radar image T−τ to a radar image T as:

$$\hat{d}_{T|T-\tau} = \mathcal{G}_\theta^{DEst}(Z_T, Z_{T-\tau})[\mathcal{P}_{Z_T}] \in \mathbb{R}^2 \tag{12}$$

where $Z_T$ and $Z_{T-\tau}$ are temporal enhanced features of radar images collected at times T and T−τ, respectively, $\mathcal{P}_{Z_T}$, is a two-dimensional coordinate, and τ=1, 2, . . . , T−1.

Further, in the direction estimation layer 729, the processor 301 is further configured to determine a positional vector $\hat{d}_{T|T-3}$ by applying a direction estimation head 803*a* on the enhanced features $Z_{T-1}$, and $Z_T$. The direction estimation head 803*a* is defined as:

$$\hat{d}_{T|T-3} = \mathcal{G}_\theta^{DEst}(Z_T, Z_{T-3}) \tag{13}$$

Further, in the direction estimation layer 729, the processor 301 is further configured to determine a positional vector $\hat{d}_{T|T-2}$ by applying a direction estimation head 803*b* on the enhanced features $Z_{T-2}$, and $Z_T$. The direction estimation head 803*b* is defined as:

$$\hat{d}_{T|T-2} = \mathcal{G}_\theta^{DEst}(Z_T, Z_{T-2}) \tag{14}$$

Further, in the direction estimation layer 729, the processor 301 is further configured to determine a positional vector $\hat{d}_{T|T-1}$ by applying a direction estimation head 803*c* on the enhanced features $Z_{T-1}$, and $Z_T$. The direction estimation head 803*c* is defined as:

$$\hat{d}_{T|T-1} = \mathcal{G}_\theta^{DEst}(Z_T, Z_{T-1}) \tag{15}$$

The determined positional vectors, for example, the positional vector $\hat{d}_{T|T-1}$, the positional vector $\hat{d}_{T|T-1}$, and the positional vector $\hat{d}_{T|T-1}$ indicative of the positional difference associated with the one or objects 103 across τ=4 radar images, for example the radar image 701*a*, the radar image 701*b*, the radar image 701*c*, and the radar image 701*d* in the sequence of the radar images 105.

In some embodiments, the processor 301 is further configured to display the positional vectors, for example, the positional vector 805*a*, the positional vector 805*b*, and the positional vector 805*c* with a feature map 807.

In some embodiments, the processor 301 is further configured to perform at least one of: a deformable convolution operation, a normalization operation, and convolution operation in the direction estimation layer 729. The processor 301 is further configured to perform the deformable convolution operation to capture features of one or more objects 103 displaced across t radar images.

Further, in association layer 731, the processor 301 is further configured to determine, based on the positional vectors denoted by $$\hat{d}_{T|T-\tau} = \mathcal{G}_{\theta}^{DEst}(Z_T, Z_{T-\tau})[\mathcal{P}_{Z_T}] \in \mathbb{R}^2,$$

a pair of vectors denoted by $$\{\{\hat{z}_t\}_{t=1}^T, \{\{\hat{v}_t\}_{t=1}^T\},$$

where $\hat{z}_t$ is a pseudo-observation vector, and $\hat{v}_t$ is a forward direction vector.

The pseudo-observation vector $$\{\hat{z}_t\}_{t=1}^T$$

is indicative of an anticipated observation with the positional vectors and the features of the enhanced spatiotemporal pool of features 115. Further, the forward direction vector $$\{\hat{v}_t\}_{t=1}^T$$

is indicative of a forward direction linking between anticipated observations.

In some embodiments, the processor 301 is further configured to determine the positional vectors based on the anticipated observations that are independent of a state of Bayesian filter, for example, a Kalman filter (KF) and include information about an object motion across the time T. In some embodiments, the Bayesian filter includes one or a combination of a particle filter, an extended KF, and an unscented KF.

Further, the processor 301 is further configured to determine, based on the pairs of vectors, a first similarity factor denoted by $C^{MCTrack}$ to indicate an association between the pairs of vectors. The similarity factor is defined as:

$$C^{MCTrack} = \lambda C^{angle} + (1-\lambda)C^{tracklet} \quad (16)$$

$$C^{tracklet} = \frac{1}{T-1}\sum_{\tau=1}^{T-1} GIoU\left(B_{Z_{T-\tau}}, B_{\hat{Z}_{T-\tau}}\right) \quad (17)$$

$$C^{angle} = GIoU\left(B_{Z_{T-\tau}}, B_{\hat{Z}_{T-\tau}}\right) \quad (18)$$

where λ is a weighting coefficient, B is a bounding box (BBox) with subscripts, GIoU is a Generalized Intersection Over Union operation that indicates a similarity based on a distance between two bounding boxes (BBoxes), $C^{tracklet}$ is a trajectory similarity factor indicative of an association between the positional vectors and a KF trajectory, $C^{angle}$ is an angular similarity factor indicative of an association between the current observation $Z_t$ and a KF rotated state $$\hat{X}_{T|T-1}^R.$$

Figure 9:
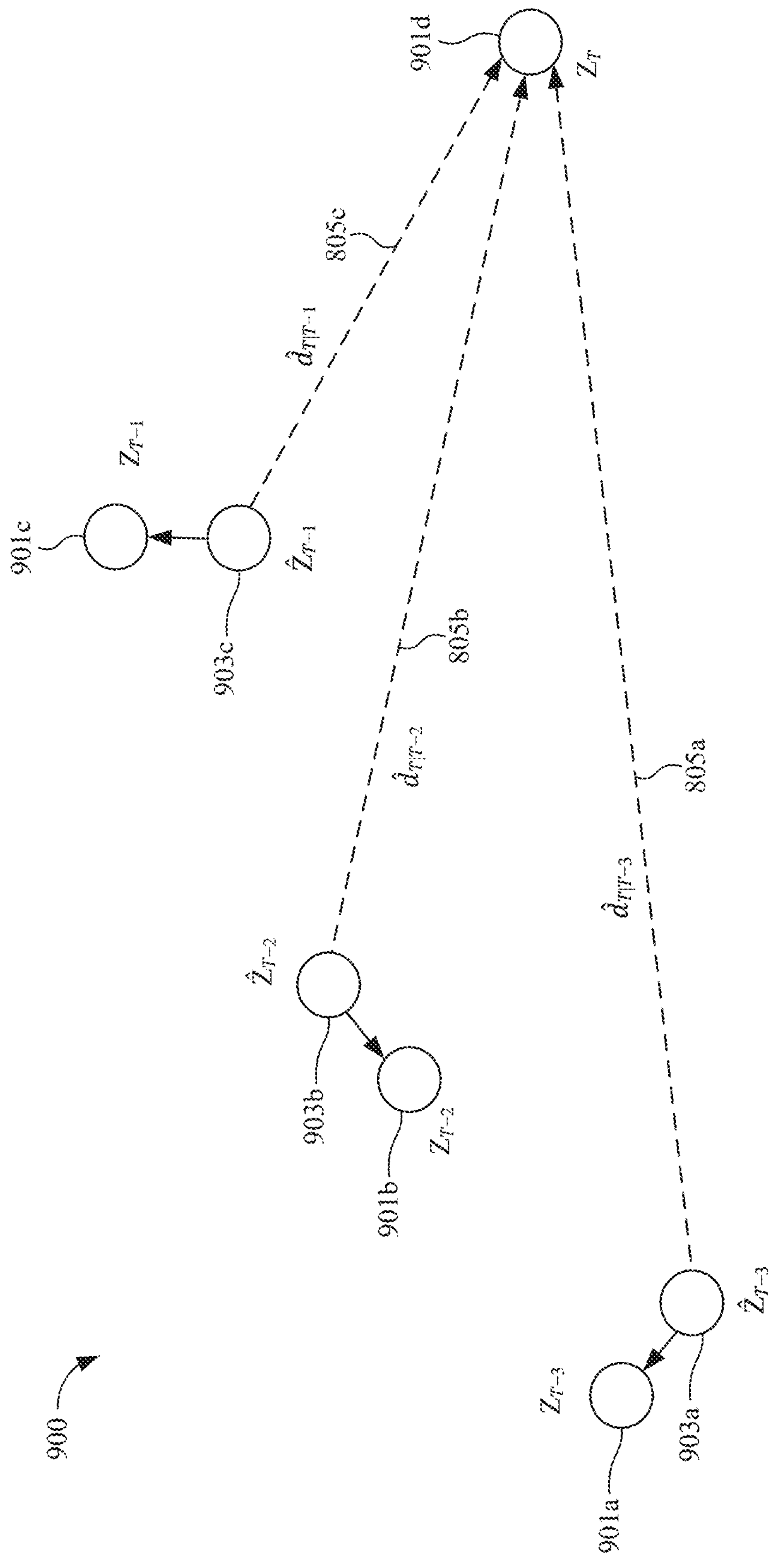
FIG. 9 illustrates a graph for determination of a trajectory similarity factor, according to an embodiment of the present disclosure.

FIG. 9 illustrates a graph 900 for determination of the trajectory similarity factor $C^{tracklet}$, according to an embodiment of the present disclosure. As shown by FIG. 9, the processor 301 is further configured to correlate an actual KF trajectory observation 901*a*, a predicted KF trajectory observation 903*a*, and the positional vector 805*a* by performing the GIoU operation on a first bounding box indicative of the actual KF trajectory observation 901*a* and the second bounding box indicative of a predicted KF trajectory observation 903*a*

Further, the processor 301 is further configured to correlate an actual KF trajectory observation 901*b*, a predicted KF trajectory observation 903*b*, and the positional vector 805*b* by performing the GIoU operation on a third bounding box indicative of the actual KF trajectory observation 901*b* and a fourth bounding box indicative of a predicted KF trajectory observation 903*b*

Further, the processor 301 is further configured to correlate an actual KF trajectory observation 901*c*, a predicted KF trajectory observation 903*c*, and the positional vector 805*c* by performing the GIoU operation on a fifth bounding box indicative of the actual KF trajectory observation 901*c* and a fourth bounding box indicative of a predicted KF trajectory observation 903*c*

Further, the processor 301 is configured to determine, based on the positional vector 805*a*, the positional vector 805*b*, and the positional vector 805*c*, an actual KF trajectory observation 901*d*.

Figure 10:
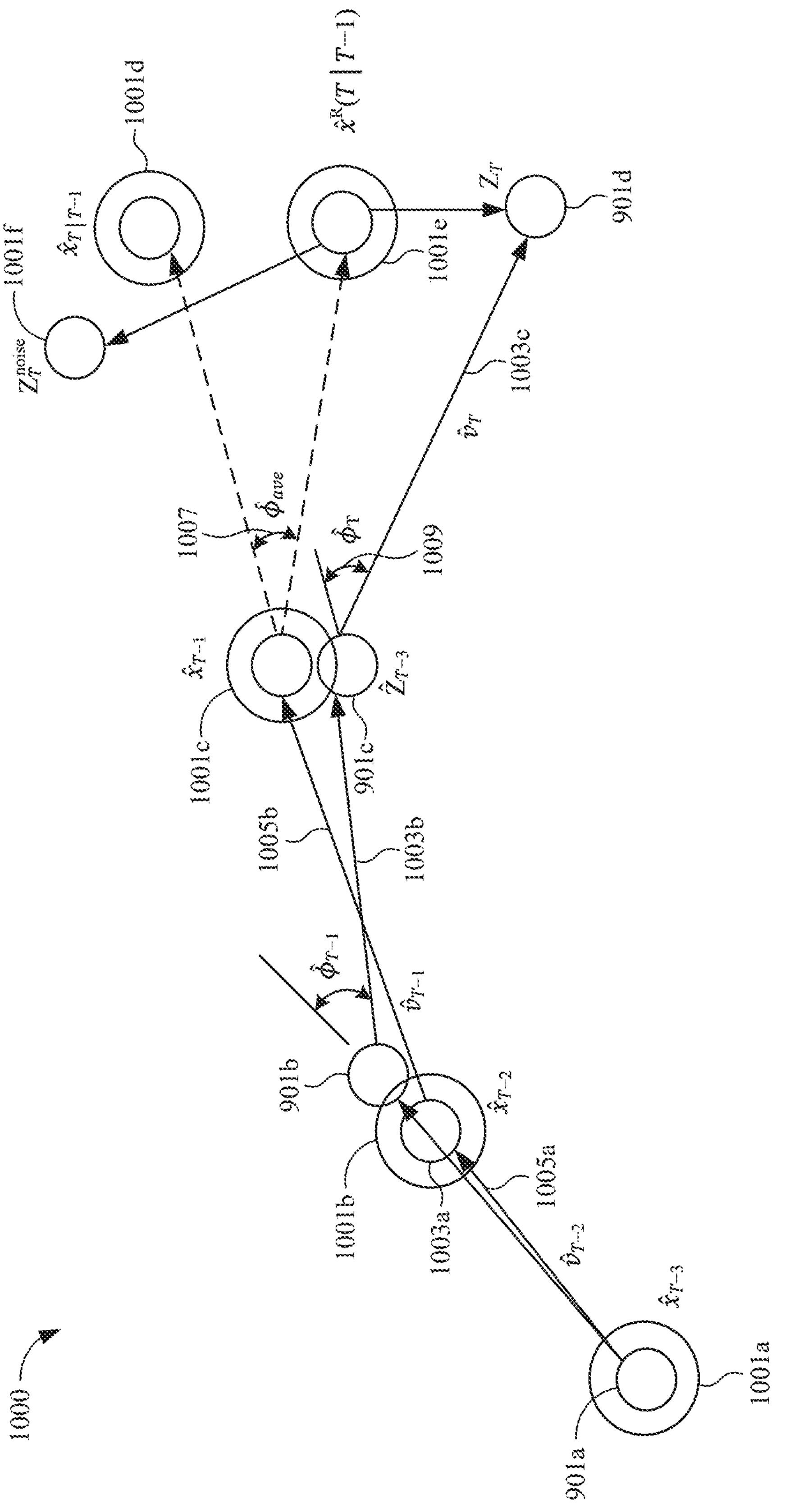
FIG. 10 illustrates a graph for determination of an angular similarity factor, according to an embodiment of the present disclosure.

FIG. 10 illustrates a graph 1000 for determination of the angular similarity factor $C^{angle}$, according to an embodiment of the present disclosure. The graph illustrates a plurality of KF previous state, for example, a KF previous state 1001*a* denoted by $\hat{x}_{T-3}$ a KF previous state 1001*b* denoted by $\hat{x}_{T-2}$ a KF previous state 1001*c* denoted by $\hat{x}_{T-1}$.

The processor 301 is further configured to indicate, using a forward direction vector 1003*a* denoted by $\hat{v}_{T-2}$, a first forward direction linking between the actual KF trajectory observation 901*a* and the actual KF trajectory observation 901*b*.

The processor 301 is further configured to indicate, using a forward direction vector 1003*b* denoted by $\hat{v}_{T-1}$, a second forward direction linking between the actual KF trajectory observation 901*b* and the actual KF trajectory observation 901*c*.

The processor 301 is further configured to indicate, using a forward direction vector 1003*c* denoted by $\hat{v}_T$, a third forward direction linking between the actual KF trajectory observation 901*c* and the actual KF trajectory observation 901*d*.

The processor 301 is further configured to indicate, using a trajectory vector 1005*a*, a first trajectory between the KF predicted state 1001*a*, and the KF predicted state 1001*b*.

The processor 301 is further configured to indicate, using a trajectory vector 1005*b*, a second trajectory between the KF predicted state 1001*b*, and the KF predicted state 1001*c*.

Further, the processor 301 is further configured to determine, based on the KF predicted state 1001*c*, a KF predicted state 1001*d* denoted by x̂T|T-1. The processor 301 is further configured to determine a KF rotated state 1001*e* by performing a rotation operation on the KF predicted state 1001*d* with a rotation matrix R of angle $\hat{\phi}_{ave}$. 1007 as:

$$p_{\hat{x}_{T|T-1}^R} = R\left(p_{\hat{x}_{T|T-1}} - p_{\hat{x}_{T-1}}\right) + p_{\hat{x}_{T-1}} \quad (19)$$

where the angle $\hat{\phi}_{ave}$ 1007 is determined as:

$$\hat{\phi}_{ave} = \frac{1}{T-2}\sum_{\rho=0}^{T-3}\hat{\phi}_{T-\rho}$$

such that $$\hat{\phi}_{T-\rho} = \cos^{-1}\frac{(\hat{v}_{T-\rho}\cdot\hat{v}_{T-\rho-1})}{\|\hat{v}_{T-\rho}\|\|\hat{v}_{T-\rho-1}\|} \tag{20}$$

where an angle $\hat{\phi}_{T-\rho}$ 1009 is an estimated angle difference between an estimated angle direction $\hat{v}_{T-\rho}$ at frame T−ρ and an estimated angle $\hat{v}_{T-\rho-1}$ at frame T−ρ−1.

Further, the processor 301 is further configured to mitigate, using the rotated KF predicted state 1001*e*, a high correlation between the KF predicted state 1001*d* based linear motion and an incorrect observation 1001*f* denoted by $$z_T^{noise}.$$

Figure 11:
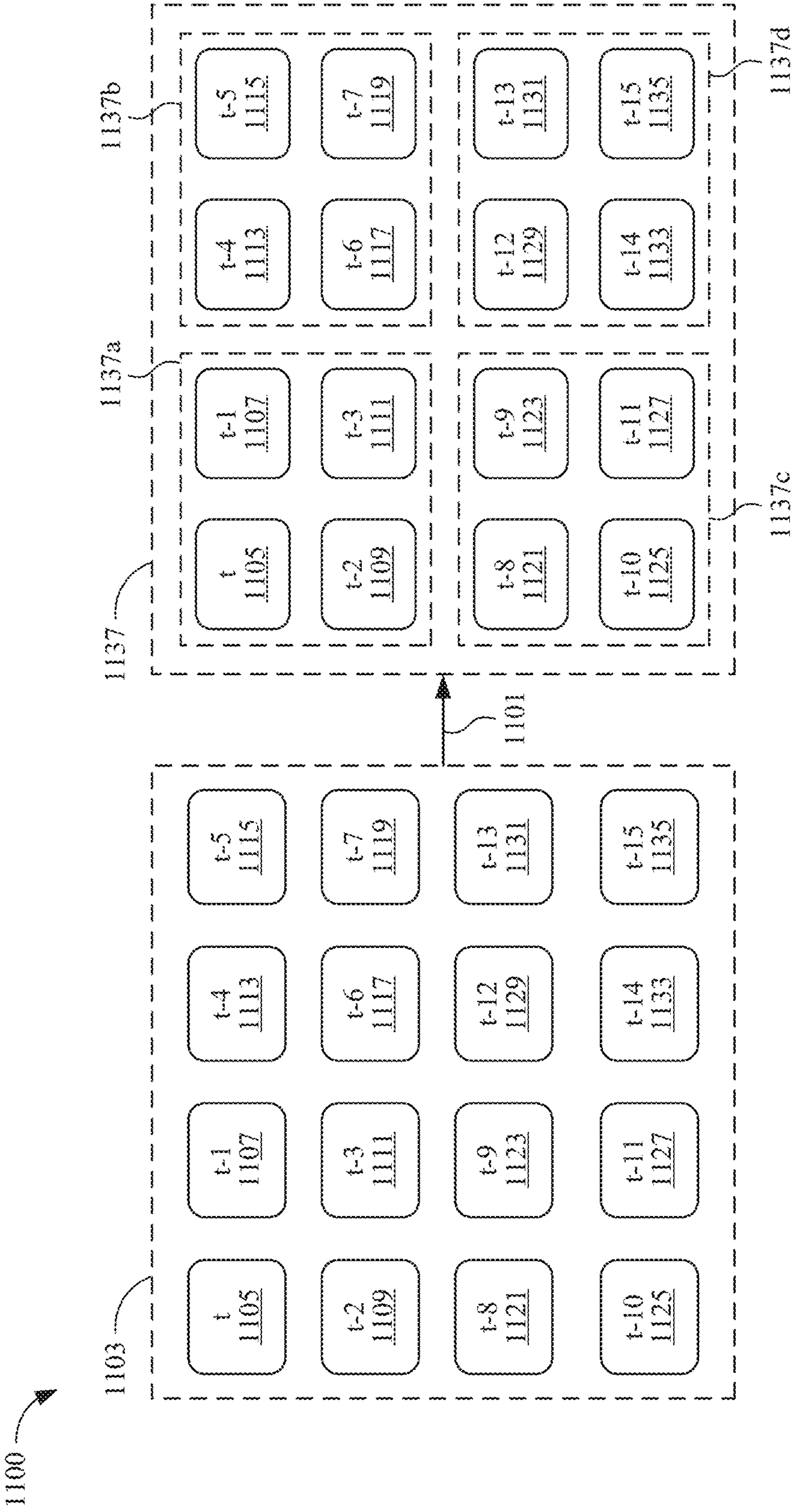
FIG. 11 illustrates a schematic for implementation of a window grouping operation in a temporal window attention layer (TWAL), according to an embodiment of the present disclosure.

FIG. 11 illustrates a schematic 1100 for implementation of a window grouping operation 1101 in the TWAL 709, according to an embodiment of the present disclosure. The schematic a sequence of radar images 1103. The sequence of radar images 1103 includes a radar image 1105 collected at time t, a radar image 1107 collected at time t−1, a radar image 1109 collected at time t−2, a radar image 1111 collected at time t−3, a radar image 1113 collected at time t−4, a radar image 1115 collected at time t−5, a radar image 1117 collected at time t−6, a radar image 1119 collected at time t−7, a radar image 1121 collected at time t−8, a radar image 1121 collected at time t−8, a radar image 1123 collected at time t−9, a radar image 1125 collected at time t−10, a radar image 1127 collected at time t−11, a radar image 1129 collected at time t−12, a radar image 1131 collected at time t−13, a radar image 1133 collected at time t−14, and a radar image 1135 collected at time t−15.

Further, the processor 301 is further configured to generate a set of temporal windows 1137 by applying a window grouping operation 1101 on the radar images in the sequence of radar images 1103. The set of temporal windows 1137 include a temporal window 1137*a*, a temporal window 1137*b*, a temporal window 1137*c*, and a temporal window 1137*d*.

In an example embodiment, the processor 301 is further configured to generate the temporal window 1137*a* by applying the window grouping operation 1101 on the radar image 1105, the radar image 1107, the radar image 1109, and the radar image 1111. Further, the processor 301 is further configured to generate the temporal window 1137*b* by applying the window grouping operation 1101 on the radar image 1113, the radar image 1115, the radar image 1117, and the radar image 1119. Further, the processor 301 is further configured to generate the temporal window 1137*c* by applying the window grouping operation 1101 on the radar image 1121, the radar image 1123, the radar image 1125, and the radar image 1127. Further, the processor 301 is further configured to generate the temporal window 1137*d* by applying the window grouping operation 1101 on the radar image 1129, the radar image 1131, the radar image 1133, and the radar image 1135.

Figure 12:
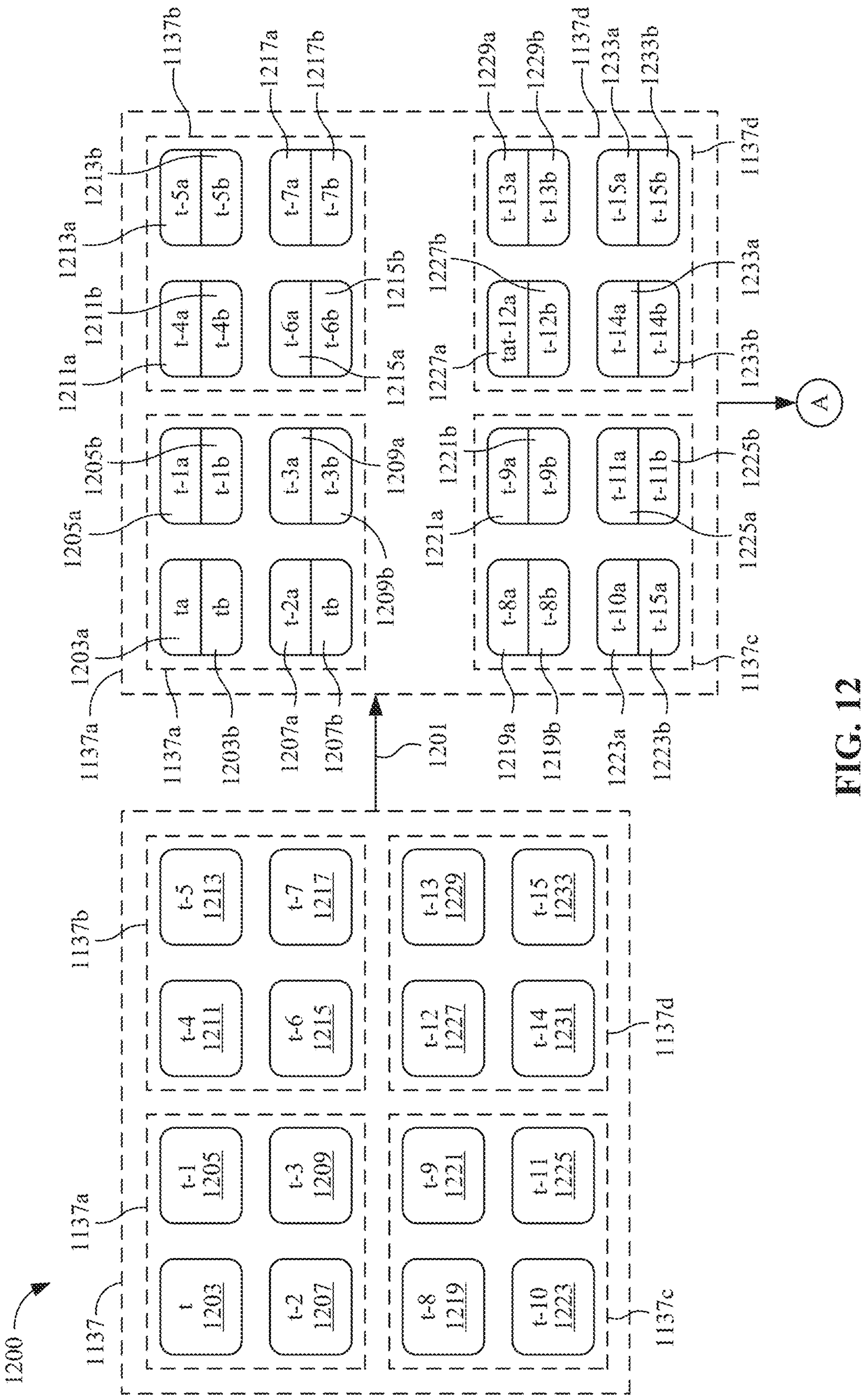
FIG. 12 illustrates a schematic for implementation of a sub-frame partitioning operation, a re-grouping operation, a reverse re-grouping operation, and a window merging operation in a temporally regrouped window attention layer (TRWAL), according to an embodiment of the present disclosure.
Figure 12:
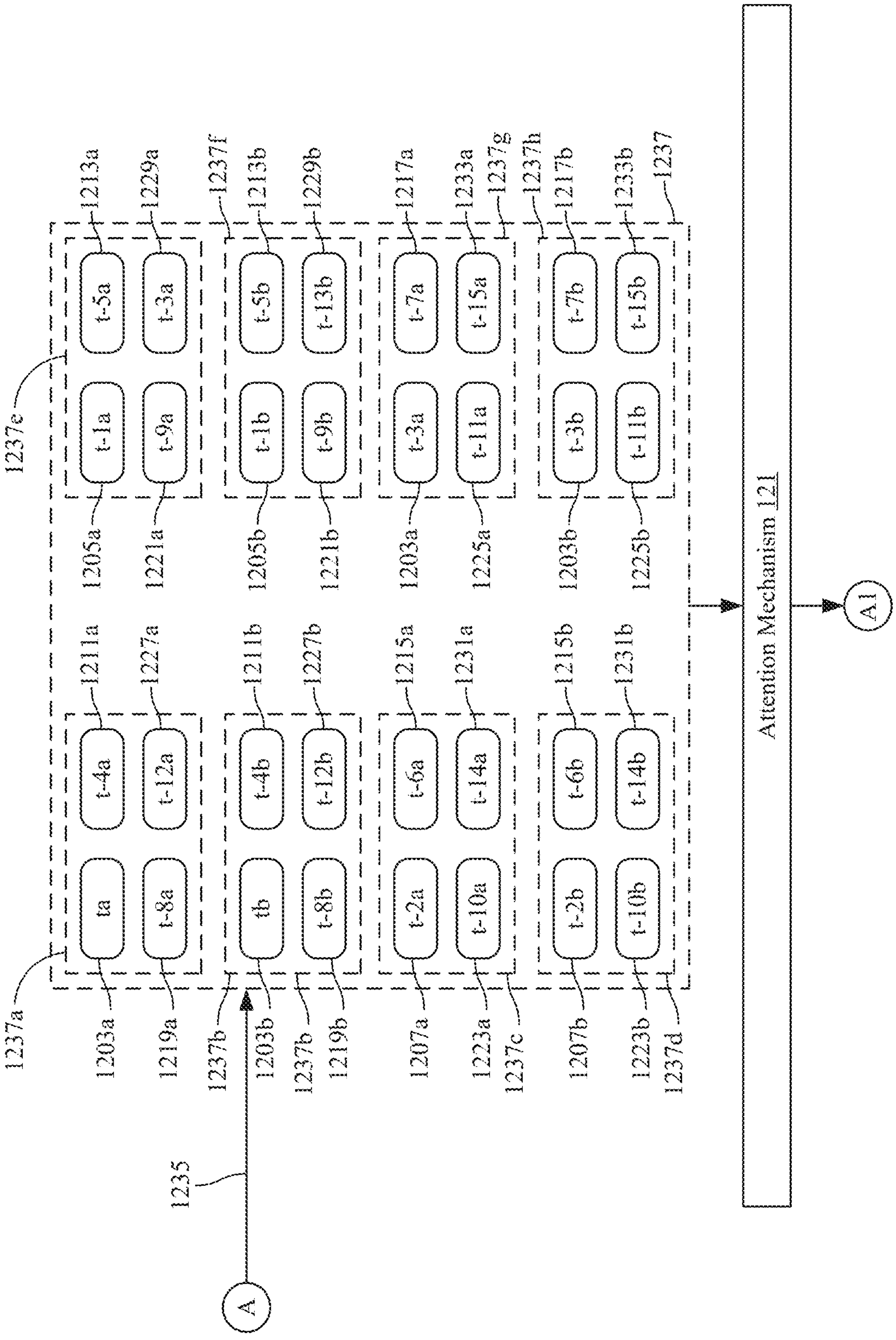
Figure 12:
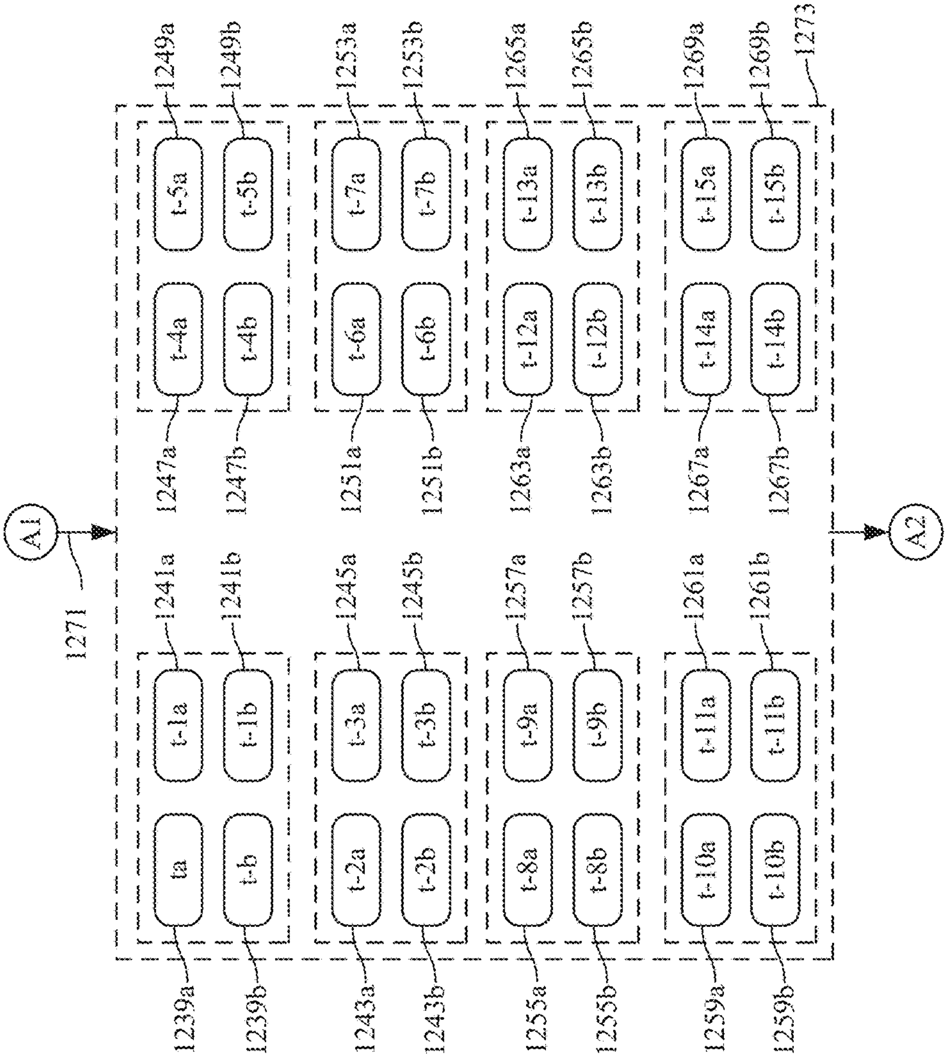
Figure 12:
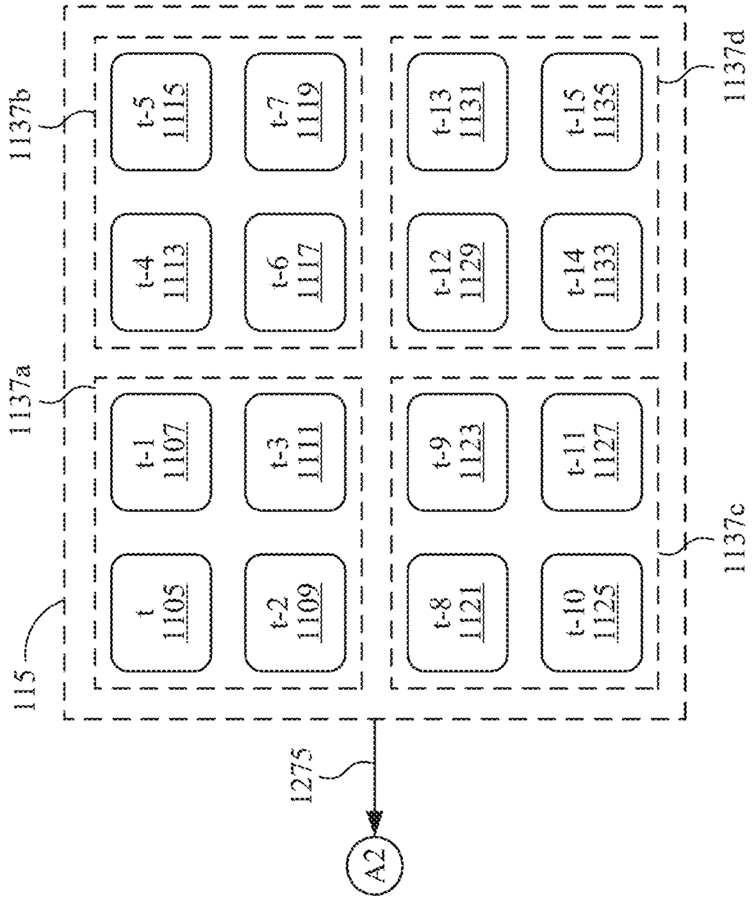

FIG. 12 illustrates a schematic 1200 for implementation of a sub-frame partitioning operation 1201, a re-grouping operation 1235, a reverse re-grouping operation 1271, and a window merging operation 1275 in the TRWAL 713, according to an embodiment of the present disclosure. As shown by FIG. 12, the processor 301 is further configured to generate a first set of enhanced spatiotemporal patches within the set of temporal windows 1137. The first set of enhanced spatiotemporal patches of features include an enhanced spatiotemporal patch 1203 collected at time t, an enhanced spatiotemporal patch 1205 collected at time t−1, an enhanced spatiotemporal patch 1207 collected at time t−2, and an enhanced spatiotemporal patch 1209 collected at time t−3, an enhanced spatiotemporal patch 1211 collected at time t−4, an enhanced spatiotemporal patch 1213 collected at time t−5, an enhanced spatiotemporal patch 1215 collected at time t−6, an enhanced spatiotemporal patch 1217 collected at time t−7, an enhanced spatiotemporal patch 1219 collected at time t−8, an enhanced spatiotemporal patch 1221 collected at time t−9, an enhanced spatiotemporal patch 1223 collected at time t−10, an enhanced spatiotemporal patch 1225 collected at time t−11, an enhanced spatiotemporal patch 1227 collected at time t−12, an enhanced spatiotemporal patch 1229 collected at time t−13, an enhanced spatiotemporal patch 1231 collected at time t−14, and an enhanced spatiotemporal patch 1233 collected at time t−15.

In some embodiments, the processor 301 is further configured to apply a sub-frame partitioning operation 1201 on each enhanced spatiotemporal patch of the first set of enhanced spatiotemporal patches to generate a spatiotemporal pool of subset features within each temporal window. The spatiotemporal pool of subset patches include a spatiotemporal pool of subset features includes a subset feature 1203*a* denoted by ta, a subset feature 1203*b* denoted by tb, a subset feature 1205*a* denoted by t−1a, a subset feature 1207*a* denoted by t−2a, a subset feature 1207*a* denoted by t−2a, a subset feature 1209*a* denoted by t−3a, a subset feature 1209*b* denoted by t−3b, a subset feature 1211*a* denoted by t−4a, a subset feature 1211*b* denoted by t−4a, a subset feature 1213*a* denoted by t−5a, a subset feature 1213*b* denoted by t−5a, a subset feature 1215*a* denoted by t−6a, a subset feature 1215*b* denoted by t−6b, a subset feature 1217*a* denoted by t−7a, a subset feature 1217*b* denoted by t−7b, a subset feature 1219*a* denoted by t−8a, a subset feature 1219*b* denoted by t−8b, a subset feature 1221*a* denoted by t−9a, a subset feature 1221*b* denoted by t−9b, a subset feature 1223*a* denoted by t−10a, a subset feature 1223*b* denoted by t−10b, a subset feature 1225*a* denoted by t−11a, a subset feature 1225*b* denoted by t−11b, a subset feature 1227*a* denoted by t−12a, a subset feature 1227*b* denoted by t−12b, a subset feature 1229*a* denoted by t−13a, a subset feature 1229*b* denoted by t−13b, a subset feature 1231*a* denoted by t−14a, a subset feature 1231*b* denoted by t−14b, a subset feature 1233*a* denoted by t−15a, and a subset feature 1233*b* denoted by t−15b.

Further, the processor 301 is further configured to generate an updated set of temporal windows 1237 by applying the re-grouping operation 1235 on each subset feature of the spatiotemporal pool of subset features. In an example embodiment, the processor 301 is further configured to generate an updated temporal window 1237*a* by applying the re-grouping operation 1235 on the subset feature. 1203*a*, the subset feature 1219*a*, the subset feature 1211*a*, and the subset feature 1227*a*.

The processor 301 is further configured to generate an updated temporal window 1237*b* by applying the re-grouping operation 1235 on the subset feature. 1203*b*, the subset feature 1219*b*, the subset feature 1211*b*, and the subset feature 1227*ab*

The processor 301 is further configured to generate an updated temporal window 1237*c* by applying the re-grouping operation 1235 on the subset feature. 1207*a*, the subset feature 1223*a*, the subset feature 1215*a*, and the subset feature 1231*a*.

The processor 301 is further configured to generate an updated temporal window 1237*d* by applying the re-grouping operation 1235 on the subset feature. 1207*b*, the subset feature 1223*b*, the subset feature 1215*b*, and the subset feature 1231*b*.

The processor 301 is further configured to generate an updated temporal window 1237*e* by applying the re-grouping operation 1235 on the subset feature. 1205*a*, the subset feature 1221*a*, the subset feature 1213*a*, and the subset feature 1229*a*.

The processor 301 is further configured to generate an updated temporal window 1237*f* by applying the re-grouping operation 1235 on the subset feature. 1205*b*, the subset feature 1221*b*, the subset feature 1213*b*, and the subset feature 1229*b*.

The processor 301 is further configured to generate an updated temporal window 1237*g* by applying the re-grouping operation 1235 on the subset feature. 1203*a*, the subset feature 1225*a*, the subset feature 1217*a*, and the subset feature 1233*a*.

The processor 301 is further configured to generate an updated temporal window 1237*h* by applying the re-grouping operation 1235 on the subset feature. 1203*b*, the subset feature 1225*b*, the subset feature 1217*b*, and the subset feature 1233*b*.

In some embodiments, the processor 301 is further configured to process, using the neural network 109 employing the attention mechanism 121, each subset features within each updated temporal window of the set of updated temporal windows 1237 to generate a second set of enhanced spatiotemporal pool of subset features 1273 for each temporal window of the updated set of temporal windows.

The enhanced spatiotemporal pool of subset features includes a subset feature 1239*a* denoted by ta, a subset feature 1239*b* denoted by tb, a subset feature 1241*a* denoted by t−1a, a subset feature 1241*b* denoted by t−1, a subset feature 1243*a* denoted by t−2a, a subset feature 1243*b* denoted by t−2b, a subset feature 1245*a* denoted by t−3a, a subset feature 1245*b* denoted by t−3b, a subset feature 1247*a* denoted by t−4a, a subset feature 1247*b* denoted by t−4b, a subset feature 1249*a* denoted by t−5a, a subset feature 1249*b* denoted by t−5a, a subset feature 1251*a* denoted by t−6a, a subset feature 1251*b* denoted by t−6b, a subset feature 1253*a* denoted by t−7a, a subset feature 1253*b* denoted by t−7b, a subset feature 1255*a* denoted by t−8a, a subset feature 1255*b* denoted by t−8b, a subset feature 1257*a* denoted by t−9a, a subset feature 1257*b* denoted by t−9b, a subset feature 1259*a* denoted by t−10a, a subset feature 1259*b* denoted by t−10b, a subset feature 1261*a* denoted by t−11a, a subset feature 1261*b* denoted by t−11b, a subset feature 1263*a* denoted by t−12a, a subset feature 1263*b* denoted by t−12b, a subset feature 1265*a* denoted by t−13a, a subset feature 1265*b* denoted by t−13b, a subset feature 1267*a* denoted by t−14a, a subset feature 1267*b* denoted by t−14b, a subset feature 1269*a* denoted by t−15a, and a subset feature 1269*b* denoted by t−15b.

Further, the processor 301 is further configured to process each spatiotemporal patch of the second set of enhanced spatiotemporal pool of subset features 1273 with the reverse re-grouping operation 1275 to generate a second set of updated spatiotemporal sub patches. Further, the processor 301 is further configured to process each subset features of the set of updated spatiotemporal sub patches with the window merging operation 1275 to generate the enhanced spatiotemporal pool of features 115.

Figure 13:
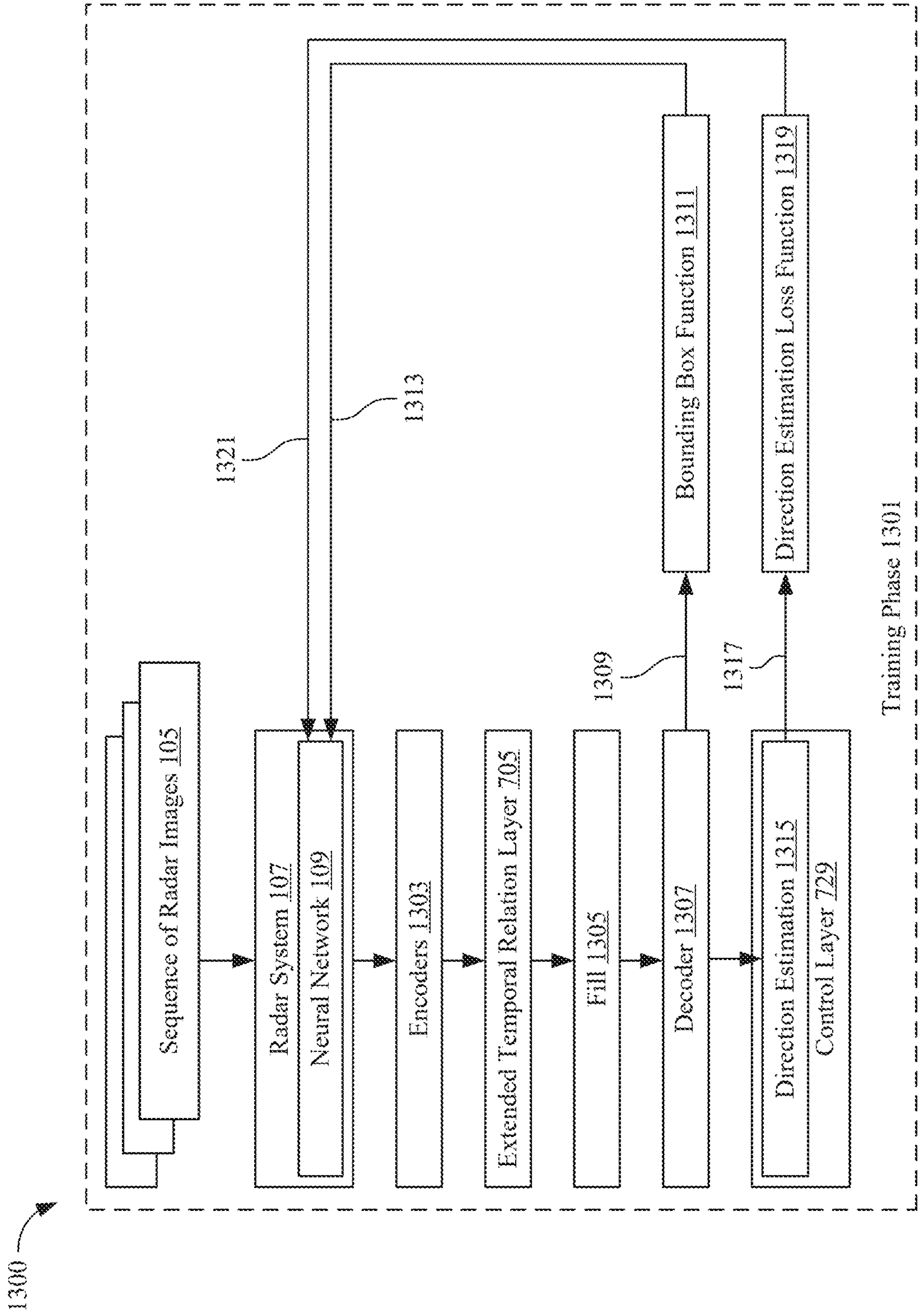
FIG. 13 is a diagram that illustrates an example embodiment of a training phase of a neural network, according to an embodiment of the present disclosure.

FIG. 13 is a diagram 1300 that illustrates an example embodiment of a training phase 1301 of the neural network 109, according to an embodiment of the present disclosure. As shown by FIG. 13, the radar system 107 is configured to receive the sequence of radar images 105. Further, the radar system 107 is further configured to employ an encoder 1303 to transform radar images into the high-level features and accentuate a position of the one or more objects 103.

Further, the radar system 107 is further configured to process the high-level features in the ETRL 705 to generate enhanced high-level features. Further, the radar system 107 is further configured to fill 1305 the enhanced high-level features to the decoder 1307.

Further, the decoder 1307 is configured to output, based on the enhanced high-level features, a heatmap 1309 to detect the one or more objects 103.

Further, the radar system 107 is further configured to obtain object's center coordinates from the heatmap 1309. Further, the neural network 109 is further configured to learn, using a bounding box loss function 1309, heatmap attributes from feature representations of the heatmap 1309.

The bounding box loss function 1311 includes a linear combination of regression functions. Further, the linear combination of regression functions includes at least two of: a heatmap loss function, $$\mathcal{L}_t^h$$

a width and length loss function $$\mathcal{L}_t^b,$$

an orientation loss function $$\mathcal{L}_t^r,$$

and an offset loss function $$\mathcal{L}_t^o.$$

The bounding box loss function is defined as:

$$\mathcal{L}_t^{BBox} := \frac{1}{N_{gt}} \sum\nolimits_{k=1}^{N_{gt}} \left(\mathcal{L}_{t,k}^b + \mathcal{L}_{t,k}^r + \mathcal{L}_{t,k}^o\right) - \frac{1}{N} \sum\nolimits_{i=1}^{N} \mathcal{L}_{t,i}^h \tag{21}$$

where k is a k-th ground truth object, N is a total number of pixels in the heatmap 1309, $N_{gt}$ is a total number of ground truth bounding boxes. Each regression function is defined as:

$$\mathcal{L}_{t,i}^h := \mathbb{1}_{\{h_{t,i}=1\}} \left(1 - \hat{h}_{t,i}\right)^{\alpha} \log\left(\hat{h}_{t,i}\right) + 1_{\{h_{t,i} \neq 1\}} (1 - h_{t,i})^{\beta} \hat{h}_{t,i}^{\alpha} \log\left(1 - \hat{h}_{t,i}\right) \tag{21a}$$

$$\mathcal{L}_{t,k}^b := S_{L_1}\left(\left\| \mathcal{G}_\theta^b\left(Z_t\left[P_{t,k}^{gt}\right]\right) - (w_{t,k}, h_{t,k})^{\top} \right\|\right) \tag{21b}$$

-continued $$\mathcal{L}^{r}_{t,k} := S_{L_1}\left(\left\|\mathcal{G}^{r}_{\theta}\left(Z_t\left[P^{gt}_{t,k}\right] - (\cos\vartheta_{t,k}, \sin\vartheta_{t,k})^{\top}\right\|\right) \tag{21c}$$

$$\mathcal{L}^{o}_{t,k} := S_{L_1}\left(\left\|\mathcal{G}^{o}_{\theta}\left(Z_t\left[P^{gt}_{t,k}\right] - (o_{x,t,k}, o_{y,t,k})^{\top}\right\|\right) \tag{21d}$$

where $h_{t,i}$ and $\hat{h}_{t,i}$ are a ground-truth value and a predicted value at i-th coordinate in $$Z^{hm}_t,$$

α and β are hyper-parameters, $$P^{gt}_{t,k}$$

is a coordinate $(c_{x,t,k}, c_{y,t,k})$ of a center of k-th ground truth object, $(w_{t,k}, h_{t,k})$ are the object width and the object length, $(o_{x,t,k}, o_{y,t,k})$ is the object offsets defined as:

$$(o_{x,t,k}, o_{y,t,k}) = \left(\frac{c_{x,t,k}}{s} - \left\lceil\frac{c_{x,t,k}}{s}\right\rceil, \frac{c_{y,t,k}}{s} - \left\lceil\frac{c_{y,t,k}}{s}\right\rceil\right) \tag{22}$$

and $S_{L_1}(\ )$ is a smooth $L_1$ loss.

Further, for each training step of the training phase 1301, the radar system 107 is further configured to determine, using the bounding box loss function 1311, a bounding box loss indicative of a loss associated with the one or more bounding boxes. Thee processor 301 is further configured to train the neural network 109 based on the output 1313 of the bounding box function 1311 indicative of the loss associated with the one or more bounding boxes.

In some embodiments, the radar system 107 is further configured to determine the bounding box loss for a successive time horizon t=1 to t=T and a preceding time horizon t=T and t=1, simultaneously. Therefore, optimization can be viewed as a bidirectional backward-forward training through T frames.

In some embodiments, the processor 301 is further configured to determine positional vectors 1317 to indicate the positional difference associated with the one or more objects 103 in the sequence of the radar image 105.

In some embodiments, the processor 301 is further configured to determine, using a direction estimation loss function 1319, a direction estimation loss 1321 associated with an anticipated positional difference of the one or more objects 103 in the sequence of the radar images 105. The direction estimation loss 1321 is defined as:

$$\mathcal{L}^{DEst}_{t} := \frac{1}{N_{gt}}\sum\nolimits_{k=1}^{N_{gt}}\mathcal{L}^{DEst}_{t,k} \tag{23a}$$

$$\mathcal{L}^{DEst}_{t,k} := \frac{1}{T-1}\sum\nolimits_{\mathcal{T}=1}^{T}\begin{cases} S_{L_1}\left(\left\|\hat{d}_{t|\mathcal{T}} - d^{gt}_{t|\mathcal{T}}\right\|\right) & \mathcal{T} \neq t \\ 0, & \mathcal{T} = 0 \end{cases} \tag{23b}$$

where $$\hat{d}_{t|\mathcal{T}} = \mathcal{G}^{b}_{\theta}(Z_t, Z_{\mathcal{T}})\left[P^{gt}_{t,k}\right]$$

is a two dimensional direction from a position of time $\mathcal{T}$ to a position of time t, $$P^{gt}_{t,k}$$

is a coordinate $(x_{t,k}, y_{t,k})$ of a center of $k_{th}$ ground truth object and $S_{L_1}(\bullet)$ is a smooth $L_1$ loss.

$$d^{gt}_{t,\mathcal{T}} = p^{gt}_{t,k} - p^{gt}_{\mathcal{T},k}$$

is a ground truth direction.

In some embodiments, the processor 301 is further configured to determine the ground truth direction based on a difference between the coordinates of the k-th object. Further, the processor 301 is further configured to train the neural network 109 based on the direction estimation loss 1321. The direction estimation loss improves a consistency of detection positions between radar images, thereby increasing a detection performance and a tracking performance.

FIG. 14 illustrates an object tracking algorithm 1400, according to an embodiment of the present disclosure. At step 1401, the processor 301 is further configured to receive a video sequence of radar images denoted by V, an object detector denoted by ETR, a direction estimator head denoted by DEst, a detection score threshold γ, and a birth threshold β.

At step 1403, the processor 301 is further configured to initialize a track set of the video sequence denoted by $\mathcal{T}$ to null ϕ.

For each radar image $f_k$ in the video sequence of radar images, at step 1405, the processor 301 is further configured to determine, using the object detector ETR, a set of bounding boxes $D_K$ to detect the one or more objects 103.

$$D_K \leftarrow ETR(f_k) \tag{24a}$$

In some embodiments, the object detector ETR is configured to process, each radar image $f_k$ in the ETRL 705 to determine the set of bounding boxes $D_K$ to detect the one or more objects 103.

At step 1407, the processor 301 is further configured to determine, using the direction estimator DEst, a set of object trajectories $\mathcal{J}_k$ corresponding to the one or more objects 103.

$$\mathcal{J}_K \leftarrow DEst(f_k) \tag{24b}$$

In some embodiments, the direction estimator DEst is configured to process, each radar image $f_k$ in the layer RRRR to determine the set of object trajectories $\mathcal{J}_k$ corresponding to the one or more objects 103.

At step 1409, the processor 301 is further configured to initialize a set of high detection score $D_{high}$ to null.

At step 1411, the processor 301 is further configured to initialize a set of high object trajectory score $\mathcal{J}_{high}$ to null.

Further, for each bounding box d in the set of bounding boxes $D_k$ and for each object trajectory j in the set of object trajectories $\mathcal{J}_k$, at step 1413, a determination is made whether the a detection score of a current bounding box is greater than the detection score threshold γ.

If the detection score of the current bounding box is greater than the detection score threshold γ, then, the processor 301 is further configured to update a set of high detection score $D_{high}$ by adding the current bounding box to set of high detection score $D_{high}$ Further, the processor 301 is further configured to update the set of high object trajectory score $\mathcal{J}_{high}$ by adding a current object trajectory to the set of the set of high object trajectory score $\mathcal{J}_{high}$.

Further, for each track t in the set of tracks $\mathcal{T}$, at step 1415, the processor 301 is further configured to determine, using a KF function, a track new location.

At step 1417, the processor 301 is further configured to associate the set of tracks, the set of bounding boxes, and the set of object trajectories.

At step 1419, the processor 301 is further configured to generate a set of remaining unmatched objects $D_{remain}$ from remaining unmatched objects associated with the set of high detection score $D_{high}$.

At step 1421, the processor 301 is further configured to generate a set of remaining matched tracks $\mathcal{T}_{remain}$ from remaining matched tracks associated with the set of tracks $\mathcal{T}$.

Further, for each track t in the set of remaining matched tracks $\mathcal{T}_{remain}$, at step 1423, the processor 301 is further configured to update, using a KF update function, a status of the matched tracks.

At step 1425, the processor 301 is further configured to delete unmatched tracks from the set of tracks $\mathcal{T}$.

Further, for each unmatched object d in the set of remaining unmatched objects $D_{remain}$, at step 1427, a determination is made whether a detection score of a current remaining unmatched object is greater than the birth threshold β or not. If the current remaining unmatched object is greater than the birth threshold, β, then the processor 301 is further configured to update the set of tracks by adding the current remaining unmatched object.

Figure 15:
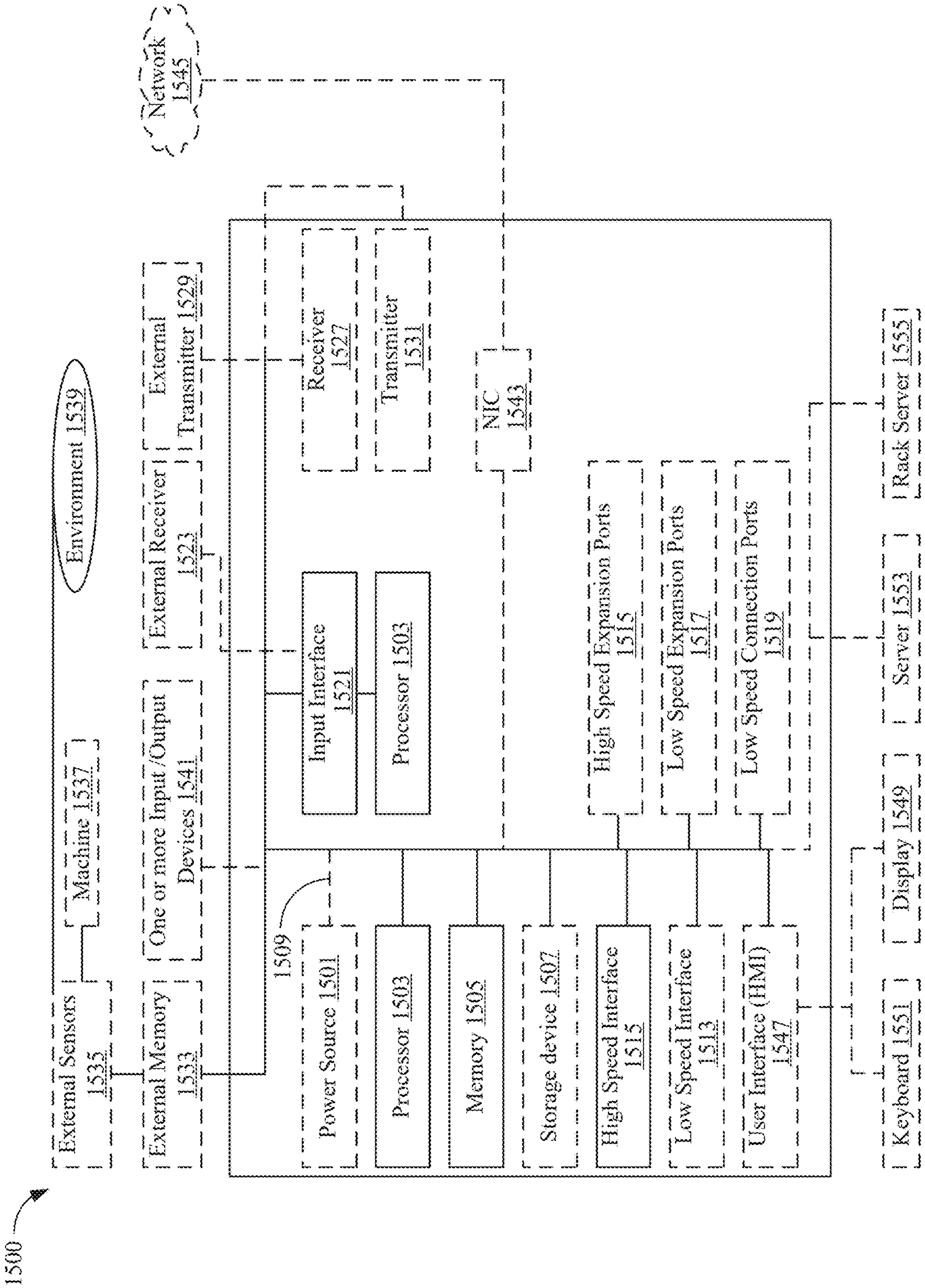
FIG. 15 is a schematic diagram illustrating a computing system that can be used for implementing systems and methods of the present disclosure.

FIG. 15 is a schematic illustrating a computing device 1500 for implementing of systems and methods of the present disclosure. The computing device 1500 includes a power source 1501, a processor 1503, a memory 1505, a storage device 1507, all connected to a bus 1509. Further, a high-speed interface 1511, a low-speed interface 1513, high-speed expansion ports 1515 and low speed connection ports 1517, can be connected to the bus 1509. In addition, a low-speed expansion port 1519 is in connection with the bus 1509. Further, an input interface 1521 can be connected via the bus 1509 to an external receiver 1523 and an output interface 1525. A receiver 1527 can be connected to an external transmitter 1529 and a transmitter 1531 via the bus 1509. Also connected to the bus 1509 can be an external memory 1533, external sensors 1535, machine(s) 1537, and an environment 1539. Further, one or more external input/output devices 1541 can be connected to the bus 1509. A network interface controller (NIC) 1543 can be adapted to connect through the bus 1509 to a network 1545, wherein data or other data, among other things, can be rendered on a third-party display device, third party imaging device, and/or third-party printing device outside of the computing device 1500.

The memory 1505 can store instructions that are executable by the computing device 1500 and any data that can be utilized by the methods and systems of the present disclosure. The memory 1505 can include random access memory (RAM), read only memory (ROM), flash memory, or any other suitable memory systems. The memory 1505 can be a volatile memory unit or units, and/or a non-volatile memory unit or units. The memory 1505 may also be another form of computer-readable medium, such as a magnetic or optical disk.

The storage device 1507 can be adapted to store supplementary data and/or software modules used by the computer device 1500. The storage device 1507 can include a hard drive, an optical drive, a thumb-drive, an array of drives, or any combinations thereof. Further, the storage device 1507 can contain a computer-readable medium, such as a floppy disk device, a hard disk device, an optical disk device, or a tape device, a flash memory or other similar solid-state memory device, or an array of devices, including devices in a storage area network or other configurations. Instructions can be stored in an information carrier. The instructions, when executed by one or more processing devices (for example, the processor 1503), perform one or more methods, such as those described above.

The computing device 1500 can be linked through the bus 1509, optionally, to a display interface or user Interface (HMI) 1547 adapted to connect the computing device 1500 to a display device 1549 and a keyboard 1551, wherein the display device 1549 can include a computer monitor, camera, television, projector, or mobile device, among others. In some implementations, the computer device 1500 may include a printer interface to connect to a printing device, wherein the printing device can include a liquid inkjet printer, solid ink printer, large-scale commercial printer, thermal printer, UV printer, or dye-sublimation printer, among others.

The high-speed interface 1511 manages bandwidth-intensive operations for the computing device 1500, while the low-speed interface 1513 manages lower bandwidth-intensive operations. Such allocation of functions is an example only. In some implementations, the high-speed interface 1511 can be coupled to the memory 1505, the user interface (HMI) 1549, and to the keyboard 1551 and the display 1549 (e.g., through a graphics processor or accelerator), and to the high-speed expansion ports 1515, which may accept various expansion cards via the bus 1509. In an implementation, the low-speed interface 1513 is coupled to the storage device 1507 and the low-speed expansion ports 1517, via the bus 1509. The low-speed expansion ports 1517, which may include various communication ports (e.g., USB, Bluetooth, Ethernet, wireless Ethernet) may be coupled to the one or more input/output devices 1541. The computing device 1500 may be connected to a server 1553 and a rack server 1555. The computing device 1500 may be implemented in several different forms. For example, the computing device 1500 may be implemented as part of the rack server 1555.

The description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Further, embodiments of the present disclosure and the functional operations described in this specification can be implemented in digital electronic circuitry, in tangibly embodied computer software or firmware, in computer hardware, including the structures disclosed in this specification and their structural equivalents, or in combinations of one or more of them. Further some embodiments of the present disclosure can be implemented as one or more computer programs, i.e., one or more modules of computer program instructions encoded on a tangible non transitory program carrier for execution by, or to control the operation of, data processing apparatus. Further still, program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

According to embodiments of the present disclosure the term "data processing apparatus" can encompass all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code.

A computer program can be deployed to be executed on one computer or on multiple computers that are located at one site or distributed across multiple sites and interconnected by a communication network. Computers suitable for the execution of a computer program include, by way of example, can be based on general or special purpose microprocessors or both, and any other kind of central processing unit. Generally, a central processing unit will receive instructions and data from a read only memory or a random access memory or both. The essential elements of a computer are a central processing unit for performing or executing instructions and one or more memory devices for storing instructions and data.

Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A radar system for detecting and tracking one or more objects in a scene, the radar system comprising: a processor; and a memory having instructions stored thereon that, when executed by the processor, cause the radar system to:

collect features of each radar image in a sequence of radar images indicative of radar measurements of the scene at different consecutive instances of time to form a spatiotemporal pool of features collected across space and time, wherein the sequence of radar images includes a plurality of radar images;

process, using a neural network employing an attention mechanism, the spatiotemporal pool of features to generate a spatiotemporal pool of selected features;

partition, using the neural network employing a window shifting mechanism, the spatiotemporal pool of selected features to generate a set of shifted windows, wherein each shifted window of the set of shifted windows temporally overlaps with at least one other shifted window of the set of shifted windows;

generate, using the neural network employing the window shifting mechanism, discrete spatiotemporal patches based on the set of shifted windows;

process, using the neural network employing the attention mechanism, the discrete spatiotemporal patches to generate an enhanced spatiotemporal pool of features; and determine at least one property of the one or more objects in the scene based on the enhanced spatiotemporal pool of features.

2. The radar system of claim 1, wherein the processor is further configured to:

generate the discrete spatiotemporal patches based on temporally indexed radar images associated with each shifted window of the set of shifted windows.

3. The radar system of claim 2, wherein the processor is further configured to:

generate a first discrete spatiotemporal patch of the discrete spatiotemporal patches based on one temporally indexed radar images of the temporally indexed radar images associated with each shifted window of the set of shifted windows; and generate a second discrete spatiotemporal patch of the discrete spatiotemporal patches based on another temporally indexed radar images of the temporally indexed radar images associated with each shifted window of the set of shifted windows.

4. The radar system of claim 3, wherein the processor is further configured to process, using the neural network employing the attention mechanism iteratively, the first discrete spatiotemporal patch of the discrete spatiotemporal patches and the second discrete spatiotemporal patch of the discrete spatiotemporal patches to generate a spatiotemporal pool of updated features.

5. The radar system of claim 4, wherein the processor is further configured to apply a window merging operation corresponding to overlapped positions of each shifted window associated the spatiotemporal pool of updated features to generate the enhanced spatiotemporal pool of features.

6. The radar system of claim 5, wherein the window merging operation include at least one of: a maximization operation, a summation operation, and a mean operation.

7. The radar system of claim 1, wherein the attention mechanism corresponds to a masked cross attention mechanism.

8. The radar system of claim 1, wherein the determined at least one property of the one or more objects corresponds to at least one of: object center coordinates, an object width, an object length, an object height, an object orientation, and object offsets.

9. The radar system of claim 1, wherein the processor is further configured to output, based on each enhanced feature of the enhanced spatiotemporal pool of features, one or more visual indicators to indicate the determined at least one property of the one or more objects in the scene.

10. The radar system of claim 9, wherein the one or more visual indicators correspond to one or more bounding boxes.

11. The radar system of claim 10, wherein the processor is further configured to train the neural network based on an output of a bounding box loss function indicative of a bounding box loss associated with the one or more bounding boxes, wherein the bounding box loss function includes a linear combination of regression functions.

12. The radar system of claim 11, wherein the linear combination of regression functions includes at least two of: a heatmap loss function, a width and length loss function, an orientation loss function, and an offset loss function.

13. The radar system of claim 1, wherein the processor is further configured to generate a set of temporal windows by applying a window grouping operation on the radar images in the sequence of radar images;

permute an order associated with the radar images to generate concatenated sequences of permuted radar images corresponding to each temporal window of the set of temporal windows;

collect features for the concatenated sequences of permutated radar images corresponding to each temporal window of the set of temporal windows to generate the spatiotemporal pool of features; and process, using the neural network employing the attention mechanism, the spatiotemporal pool of features within each temporal window to generate a first set of enhanced spatiotemporal patches of features corresponding to each radar image in the sequence of radar images.

14. The radar system of claim 13, wherein the processor is further configured to:

partition each enhanced spatiotemporal patch of the first set of enhanced spatiotemporal patches of features to generate a spatiotemporal pool of subset features within each temporal window;

generate an updated set of temporal windows by applying a re-grouping operation on each subset feature of the spatiotemporal pool of subset features; and process, using the neural network employing the attention mechanism, each subset features within each updated temporal window of the set of updated temporal windows to generate a second set of enhanced spatiotemporal patches of subset features for each temporal window of the updated set of temporal windows.

15. The radar system of claim 14, wherein the processor is further configured to:

process, each spatiotemporal patch of the second set of enhanced spatiotemporal patches with a reverse regrouping operation to generate a set of updated spatiotemporal sub patches; and process, each updated spatiotemporal sub patch of the set of updated spatiotemporal sub patches with the window merging operation to generate the enhanced spatiotemporal pool of features.

16. The radar system of claim 15, wherein the processor is further configured to determine, based on each enhanced feature of the enhanced spatiotemporal pool of features, positional vectors indicative of a positional difference associated with the one or more objects in the sequence of the radar images.

17. The radar system of claim 16, wherein the processor is further configured to determine pairs of vectors based on the positional vectors, each pair of the pairs of vectors include a pseudo-observation vector and forward direction vector;

determine, based on the pairs of vectors, a first similarity factor to indicate an association between the pairs of vectors; and generate, based on a similarity factor, a set of control commands to the one or more objects in the scene.

18. The radar system of claim 17, wherein the processor is further configured to:

perform a generalized intersection over union operation on bounding boxes associated with predicted trajectory observations and actual trajectory observations to determine a trajectory similarity factor;

perform a rotation operation on a Bayesian filter predicted state to determine an angular similarity factor; and determine the similarity factor based on the trajectory similarity factor and the angular similarity factor.

19. The radar system of claim 17, wherein the processor is further configured to train the neural network based on a direction estimation loss function indicative of a direction estimation loss associated with an anticipated positional difference of the one or more objects in the sequence of the radar images.

20. A computer-implemented method for detecting and tracking one or more objects in a scene, the method comprising:

collecting features of each radar image in a sequence of radar images indicative of radar measurements of the scene at different consecutive instances of time to form a spatiotemporal pool of features collected across space and time, wherein the sequence of radar images includes a plurality of radar images;

processing, using a neural network employing an attention mechanism, the spatiotemporal pool of features to generate a spatiotemporal pool of selected features;

partitioning, using the neural network employing a window shifting mechanism, the spatiotemporal pool of selected features to generate a set of shifted windows, wherein the each shifted window of the set of shifted windows temporally overlaps with at least one other shifted window of the set of shifted windows;

generating, using the neural network employing the window shifting mechanism, discrete spatiotemporal patches based on the set of shifted windows;

processing, using the neural network employing the attention mechanism, the discrete spatiotemporal patches to generate an enhanced spatiotemporal pool of features; and determining at least one property of the one or more objects in the scene based on the enhanced spatiotemporal pool of features.

21. A non-transitory computer-readable storage medium embodied thereon a program executable by a processor for performing a method for detecting and tracking one or more objects in a scene, the method comprising:

collecting features of each radar image in a sequence of radar images indicative of radar measurements of the scene at different consecutive instances of time to form a spatiotemporal pool of features collected across space and time, wherein the sequence of radar images includes a plurality of radar images;

processing, using a neural network employing an attention mechanism, the spatiotemporal pool of features to generate a spatiotemporal pool of selected features;

partitioning, using the neural network employing a window shifting mechanism, the spatiotemporal pool of selected features to generate a set of shifted windows, wherein the each shifted window of the set of shifted windows temporally overlaps with at least one other shifted window of the set of shifted windows;

generating, using the neural network employing the window shifting mechanism, discrete spatiotemporal patches based on the set of shifted windows;

processing, using the neural network employing the attention mechanism, the discrete spatiotemporal patches to generate an enhanced spatiotemporal pool of features; and determining at least one property of the one or more objects in the scene based on the enhanced spatiotemporal pool of features.

* * * * *